United States Patent
Hamamoto et al.

(10) Patent No.: US 11,913,521 B2
(45) Date of Patent: Feb. 27, 2024

(54) POWER-TRANSMITTING FRICTION BELT AND METHOD FOR MANUFACTURING SAME

(71) Applicant: Mitsuboshi Belting Ltd., Kobe (JP)

(72) Inventors: Kouhei Hamamoto, Hyogo (JP); Yorifumi Hineno, Hyogo (JP)

(73) Assignee: Mitsuboshi Belting Ltd., Kobe (JP)

( * ) Notice: Subject to any disclaimer, the term of this patent is extended or adjusted under 35 U.S.C. 154(b) by 383 days.

(21) Appl. No.: 17/299,053

(22) PCT Filed: Nov. 29, 2019

(86) PCT No.: PCT/JP2019/046919
§ 371 (c)(1),
(2) Date: Jun. 2, 2021

(87) PCT Pub. No.: WO2020/116359
PCT Pub. Date: Jun. 11, 2020

(65) Prior Publication Data
US 2022/0056983 A1   Feb. 24, 2022

(30) Foreign Application Priority Data

Dec. 6, 2018   (JP) ................... 2018-229330
Nov. 12, 2019  (JP) ................... 2019-204481

(51) Int. Cl.
*F16G 5/06* (2006.01)
*B29D 29/10* (2006.01)
*F16G 5/20* (2006.01)

(52) U.S. Cl.
CPC ............ *F16G 5/06* (2013.01); *B29D 29/10* (2013.01); *F16G 5/20* (2013.01)

(58) Field of Classification Search
CPC .................................. B29D 29/10; F16G 5/20
See application file for complete search history.

(56) References Cited

U.S. PATENT DOCUMENTS

| | | | | |
|---|---|---|---|---|
| 4,528,214 A | * | 7/1985 | Long | B29D 29/10 427/175 |
| 4,582,741 A | * | 4/1986 | Tassone | B29D 23/001 428/110 |

(Continued)

FOREIGN PATENT DOCUMENTS

| | | |
|---|---|---|
| CN | 1270645 A | 10/2000 |
| CN | 103906945 A | 7/2014 |

(Continued)

OTHER PUBLICATIONS

Aug. 16, 2022—(CN) Office Action—CN App 201980079309.5, Eng Tran.

(Continued)

*Primary Examiner* — Michael R Mansen
*Assistant Examiner* — Mark K Buse
(74) *Attorney, Agent, or Firm* — Banner & Witcoff, Ltd.

(57) ABSTRACT

The present invention relates to a power-transmitting friction belt having a compressed layer and a knitted fabric. The surface of the compressed layer is covered with the knitted fabric. The knitted fabric has an overlapping section in which one end and the other end of the knitted fabric overlap each other. The overlapping section has a bonding region containing a bonding component for bonding the end and the other end of the knitted fabric together.

13 Claims, 13 Drawing Sheets

(56) References Cited

U.S. PATENT DOCUMENTS

| | | | |
|---|---|---|---|
| 5,776,026 A * | 7/1998 | Tajima | B29D 29/08 |
| | | | 474/271 |
| 5,964,742 A | 10/1999 | McCormack et al. | |
| 6,572,505 B1 | 6/2003 | Knutson | |
| 6,632,151 B1 | 10/2003 | Knutson | |
| 2003/0073533 A1 | 4/2003 | Knutson | |
| 2003/0078125 A1 * | 4/2003 | Knutson | F16G 1/28 |
| | | | 474/263 |
| 2004/0048709 A1 | 3/2004 | Knutson | |
| 2006/0293140 A1 * | 12/2006 | Daugherty | F16G 5/06 |
| | | | 156/137 |
| 2010/0167860 A1 | 7/2010 | Mori et al. | |
| 2010/0173740 A1 | 7/2010 | Mori et al. | |
| 2014/0135161 A1 | 5/2014 | Mori et al. | |
| 2014/0296010 A1 | 10/2014 | Yoshida et al. | |
| 2014/0364262 A1 | 12/2014 | Mori et al. | |
| 2016/0208890 A1 * | 7/2016 | Nonaka | C08J 3/203 |
| 2018/0169963 A1 * | 6/2018 | Dua | B29C 66/8362 |
| 2020/0173523 A1 | 6/2020 | Hamamoto et al. | |

FOREIGN PATENT DOCUMENTS

| | | |
|---|---|---|
| JP | 2003-514206 A | 4/2003 |
| JP | 2008-546960 A | 12/2008 |
| JP | 2010-242825 A | 10/2010 |
| JP | 2010-539394 A | 12/2010 |
| JP | 2013-145032 A | 7/2013 |
| JP | 2016-138220 A | 8/2016 |
| JP | 2018-044097 A | 3/2018 |
| WO | 2018/216738 A1 | 11/2018 |

OTHER PUBLICATIONS

Sep. 23, 2022—(EP) Extended EP Search Report—EP App. 19893989.4.

Jan. 28, 2020—(WO) Written Opinion of ISA—Intl App PCT/JP2019/046919.

Jan. 28, 2020—International Search Report—Intl App PCT/JP2019/046919.

Apr. 23, 2023—(CN) Notification of the Second Office Action—CN App No. 201980079309.5, Eng Tran.

Oct. 17, 2023—(CN) Decision of Rejection—CN App 201980079309.5, Eng Tran.

* cited by examiner

FIG. 12
(Results of durability test)

|  | Example | | | |
|---|---|---|---|---|
|  | 1 | 2 | 3 | 4 |
| Overlapping length | 8 mm | 4 mm | 8 mm | 8 mm |
| Adhesive component | Rubber | Rubber | Rubber | TPU |
| Proportion of adhesion region | 25% | 15% | 100% | 25% |
| Proportion of non-adhesion region | 75% | 85% | 0% | 75% |
| Shape of adhesion region | 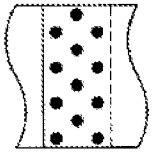 | 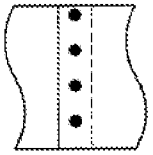 | 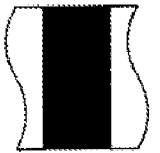 | 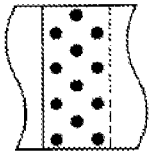 |
| Life (hour) in durability test | 165 | 150 | 110 | 250 |
| Problem | Crack | Crack | Crack | Crack |

|  | Example | | | |
|---|---|---|---|---|
|  | 5 | 6 | 7 | 8 |
| Overlapping length | 4 mm | 8 mm | 8 mm | 8 mm |
| Adhesive component | TPU | TPU | CNF-containing rubber | CNF-containing TPU |
| Proportion of adhesion region | 15% | 40% | 25% | 25% |
| Proportion of non-adhesion region | 85% | 60% | 75% | 75% |
| Shape of adhesion region | 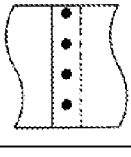 | 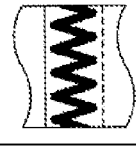 | 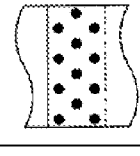 | 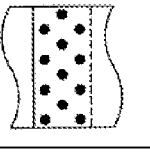 |
| Life (hour) in durability test | 220 | 205 | 185 | 280 |
| Problem | Crack | Crack | Crack | Crack |

FIG. 13
(Results of durability test)
| | Comparative Example | |
|---|---|---|
| | 1 | 2 |
| Overlapping length | 0 mm (ultrasonic welding) | 8 mm |
| Adhesive component | No | No |
| Proportion of adhesion region | - | 0% |
| Proportion of non-adhesion region | - | 100% |
| Shape of adhesion region | 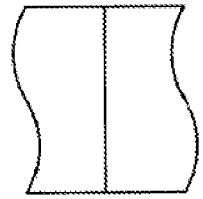 | 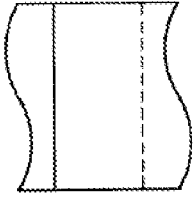 |
| Life (hour) in durability test | 72 | 15 |
| Problem | Crack | Peeling |

POWER-TRANSMITTING FRICTION BELT AND METHOD FOR MANUFACTURING SAME

CROSS REFERENCE TO RELATED APPLICATIONS

This is a U.S. National Phase Application under 35 U.S.C. § 371 of International Application No. PCT/JP2019/046919, filed Nov. 29, 2019, which claims priority to Japanese Application Nos. 2018-229330, filed Dec. 6, 2018, and 2019-204481, filed Nov. 12, 2019, which was published Under PCT Article 21(2), the entire contents of which are incorporated herein by reference.

TECHNICAL FIELD

The present invention relates to a frictional power-transmission belt in which a surface of a compression layer is covered with a knitted fabric, and a method of producing the frictional power-transmission belt.

BACKGROUND ART

Frictional power-transmission belts are widely used for driving an auxiliary machine of automobiles and for driving agricultural machines. Examples of the frictional power-transmission belts include a flat belt, a V-belt, and a V-ribbed belt. The frictional power-transmission belts are used in distinction from an engagement power-transmission belt represented by a toothed belt that transmits power by mechanically fitting a tooth portion of a pulley and a tooth portion of the belt. Among these, the V-ribbed belt is widely used for driving an auxiliary machine of automobiles because of being capable of achieving both high power-transmission capacity and bending fatigue resistance.

Some V-ribbed belts have a frictional power-transmission surface covered with a reinforcing cloth in order to improve wear resistance or adjust a friction coefficient. A woven fabric, a knitted fabric, an unwoven fabric, or the like can be applied to the reinforcing cloth. As a fiber constituting these reinforcing clothes, various fibers can be used in accordance with requirements such as wear resistance and water absorbency.

For example, Patent Literature 1 discloses a V-ribbed belt in which a rib surface (frictional power-transmission surface) is covered with a fabric (reinforcing cloth), the fabric can be stretched in two predetermined directions, the fabric contains an elastic yarn and at least one kind of inelastic yarn, and this inelastic yarn contains a cellulose-based fiber or a cellulose-based yarn. Examples of such a fabric (reinforcing cloth) used for the belt include a seamless or seamed tubular fabric (see paragraph 0020 of Patent Literature 1).

Generally, the reinforcing cloth is subjected to an adhesion treatment in order to enhance the adhesiveness between a belt body and a rubber composition. At this time, there is a problem that the productivity is lowered since the seamless tubular fabric exemplified in Patent Literature 1 cannot be applied to a continuous adhesion treatment, and the number of work-in-process is increased since it is necessary to prepare a seamless tubular fabric having a circumferential length corresponding to a belt length.

Therefore, in order to enable a continuous adhesion treatment for the reinforcing cloth and improve the productivity, the adhesion treatment is applied to a long reinforcing cloth that enables a continuous adhesion treatment, and the reinforcing cloth after the adhesion treatment is seamed (joined) to prepare a tubular reinforcing cloth. In this case, heat welding or ultrasonic welding are used as a method of joining the reinforcing cloth.

CITATION LIST

Patent Literature

Patent Literature 1: JP-T-2010-539394

SUMMARY OF INVENTION

Technical Problem

However, in the joining by using heat welding or ultrasonic welding, since edge portions of the reinforcing cloth (knitted fabric) are in a butt state, there are concerns that the strength is insufficient to generate cracks at a joint portion, or the reinforcing cloth is peel off from the rib surface starting from the cracks. In addition, since the fibers are melted and solidified at the joint portion due to the welding, the elasticity of the reinforcing cloth is reduced. Since stress is concentrated on the joint portion of the reinforcing cloth having reduced elasticity when the belt is bent, there is a concern that cracks are likely to occur in rubber forming a rib portion. Therefore, these problems are required to be solved.

Therefore, an object of the present invention is to improve the strength of a joint portion of a knitted fabric (reinforcing cloth) that covers a surface of a compression layer of a frictional power-transmission belt.

Solution to Problem

In order to solve the above problems, a frictional power-transmission belt of the present invention is a frictional power-transmission belt including a compression layer and a knitted fabric, in which a surface of the compression layer is covered with the knitted fabric, the knitted fabric has an overlapping portion in which one end and another end of the knitted fabric overlap each other, and the overlapping portion has an adhesion region containing an adhesive component that adheres the one end and the other end of the knitted fabric to each other.

When the knitted fabric covering the surface of the compression layer of the frictional power-transmission belt is joined by butt without the overlapping portion, it is difficult to sufficiently increase the strength of a joint portion of the knitted fabric, cracks occur in the joint portion, and then the knitted fabric is likely to be peeled off from the surface of the compression layer. In addition, even when the knitted fabric has an overlapping portion, if there is no adhesion region, the strength of the joint portion of the knitted fabric is not sufficient by only the adhesive component contained in the knitted fabric, and similarly, the knitted fabric is likely to be peeled off from the surface of the compression layer. Therefore, when an adhesion region containing an adhesive component that adheres one end and another end of the knitted fabric (between an upper surface side of the one end and a lower surface side of the other end) is provided in the overlapping portion, the joint portion can be reinforced to prevent the knitted fabric from peeling off from the surface of the compression layer.

In the above frictional power-transmission belt of the present invention, the overlapping portion may further have a non-adhesion region in which the one end and the other end of the knitted fabric are not adhered to each other.

When the entire overlapping portion in which the one end and the other end of the knitted fabric overlap each other is an adhesion region and no non-adhesion region exists therein, the knitted fabric is strongly restrained and thus the elasticity is reduced. As a result, there is a concern that stress is concentrated on the joint portion of the overlapping portion when the frictional power-transmission belt is bent and thus cracks are likely to occur in the compression layer. Therefore, when a non-adhesion region is provided in the overlapping portion together with the adhesion region, it is possible to alleviate the stress concentration and prevent the occurrence of cracks in the compression layer while making the adhesive force between the one end and the other end of the knitted fabric sufficient. As a result, the belt life is improved.

In addition, the above frictional power-transmission belt of the present invention may have a plurality of the adhesion regions, in which each of the adhesion regions may be arranged discontinuously in a belt width direction.

According to the above configuration, when the adhesion region is arranged in the overlapping portion, the non-adhesion region is always arranged in the belt width direction at which the adhesion region is arranged, so that it is possible to alleviate the stress concentration over the entire belt width direction at a specific portion of the overlapping portion in a belt longitudinal direction to prevent the occurrence of cracks in the compression layer.

In addition, the above frictional power-transmission belt of the present invention may have a plurality of the adhesion regions and a plurality of the non-adhesion regions, in which the plurality of the adhesion regions and the plurality of the non-adhesion regions may be arranged in a checkered pattern.

According to the above configuration, the adhesion regions and the non-adhesion regions are alternately arranged in a checkered pattern, so that it is possible to alleviate the stress concentration over the entire belt width direction at a specific portion of the overlapping portion in the belt longitudinal direction to prevent the occurrence of cracks in the compression layer.

In addition, in the above frictional power-transmission belt of the present invention, the adhesion region may be in a wavy shape or a zigzag shape.

According to the above configuration, the adhesion region is arranged in a wavy shape or a zigzag shape, so that it is possible to alternately arrange the adhesion regions and the non-adhesion regions in the overlapping portion, and to alleviate the stress concentration over the entire belt width direction at a specific portion of the overlapping portion in the belt longitudinal direction to prevent the occurrence of cracks in the compression layer.

In addition, in the above frictional power-transmission belt of the present invention.

a total area of the adhesion region may account for 10% to 50% of an area of the overlapping portion.

When the total area of the adhesion regions is less than 10% of the area of the overlapping portion, there are concerns that the strength of the joint portion of the overlapping portion in the knitted fabric cannot be sufficiently increased, cracks occur in the joint portion, and then the knitted fabric is peeled off from the surface of the compression layer. On the other hand, when the total area of the adhesion regions is more than 50% of the area of the overlapping portion, there are concerns that the knitted fabric is restrained more strongly than necessary, the elasticity is reduced, stress is concentrated on the joint portion of the overlapping portion when the frictional power-transmission belt is bent, and thus cracks are likely to occur in the compression layer. Therefore, when the total area of the adhesion regions is set to 10% to 50% of the area of the overlapping portion, it is possible to maintain the elasticity of the knitted fabric and prevent the knitted fabric from peeling off from the surface of the compression layer and the occurrence of cracks in the compression layer in a well-balanced manner, while sufficiently increasing the strength of the joint portion of the overlapping portion.

In addition, in the above frictional power-transmission belt of the present invention, the knitted fabric may be impregnated with an isocyanate.

When the knitted fabric is impregnated with an isocyanate, the wear resistance and the adhesiveness of the overlapping portion can be improved.

In addition, in the above frictional power-transmission belt of the present invention, in the adhesion region, the one end and the other end of the knitted fabric may be adhered by the adhesive component other than the isocyanate.

According to the above configuration, the knitted fabric is impregnated with an isocyanate to improve the wear resistance and the adhesiveness, and an adhesive component different from the isocyanate impregnated in the knitted fabric is used in the adhesion region, so that a sufficient adhesive force can be ensured at the joint portion of the overlapping portion, and the knitted fabric can be prevented from peeling off from the surface of the compression layer starting from the overlapping portion.

In addition, in the above frictional power-transmission belt of the present invention, the adhesive component may include a thermoplastic elastomer.

When a thermoplastic elastomer is used as the adhesive component, the occurrence of cracks in the compression layer can be prevented as compared with a case where a rubber composition is used as the adhesive component in the adhesion region.

In addition, in the above frictional power-transmission belt of the present invention, the thermoplastic elastomer may be a thermoplastic polyurethane.

The production cost can be reduced by using a highly versatile thermoplastic polyurethane as the thermoplastic elastomer used for the adhesive component in the adhesion region.

In addition, in the above frictional power-transmission belt of the present invention, the thermoplastic elastomer may have a flow start point of 100° C. or higher and 160° C. or lower.

When the flow start point of the thermoplastic elastomer is lower than 100° C., there are concerns that the strength of the adhesion region is reduced during the use of the frictional power-transmission belt, and the knitted fabric is likely to be peeled off. When the flow start point of the thermoplastic elastomer is 160° C. or lower, during the vulcanization of the frictional power-transmission belt, the thermoplastic elastomer softens to improve the adhesion to the knitted fabric, thereby improving the adhesive force. However, when the flow start point is higher than 160° C., there are concerns that the above effects are not obtained and the adhesive force is not sufficiently improved. Therefore, it is preferable that the flow start point of the thermoplastic elastomer used in the adhesion region is in the range of 100° C. or higher and 160° C. or lower.

The flow start point can be measured using a Koka-type flow tester (extruding-type plastometer) described in JIS K7210-1 (2014). A cylinder equipped with a die having a hole having an inner diameter of 1 mm and a length of 10 mm is charged with about 2 g of a thermoplastic elastomer and a load of 294 N is applied thereto. The temperature is raised from the initial temperature of 100° C. at 6° C./min and the temperature at which the thermoplastic elastomer begins to flow out of the die is defined as the flow start point.

In addition, in the above frictional power-transmission belt of the present invention, the adhesive component may include a cellulose nanofiber.

In this case, the durable life can be improved as compared with a case where the adhesive component does not contain a cellulose nanofiber.

In addition, in the above frictional power-transmission belt of the present invention, the overlapping portion may have a length of 2 mm or more and 10 mm or less in a belt circumferential direction.

When the length of the overlapping portion in the belt circumferential direction is less than 2 mm, there are concerns that the strength of the joint portion is insufficient, and thus cracks in the joint portion and peeling off of the knitted fabric is likely to occur. On the other hand, when the length of the overlapping portion in the belt circumferential direction is more than 10 mm, there are concerns that the influence of a step difference of the overlapping portion becomes large, and thus problems such as deterioration of appearance quality, abnormal noise, and tension fluctuation occur. Therefore, it is preferable that the length of the overlapping portion in the belt circumferential direction is in the range of 2 mm or more and 10 mm or less.

Further, the present invention relates to a method of producing a frictional power-transmission belt in which a surface of a compression layer is covered with a knitted fabric having an overlapping portion in which one end and another end of the knitted fabric overlap each other, in which the method may include a step of coating or spraying a mucilage prepared by dissolving a rubber composition in a solvent onto at least one of an upper side of the one end of the knitted fabric and a lower side of the other end of the knitted fabric.

When the mucilage prepared by dissolving a rubber composition in a solvent is coated or sprayed onto at least one of the upper side of the one end of the knitted fabric and the lower side of the other end of the knitted fabric, the joint portion can be reinforced to make the knitted fabric hardly peeling off from the surface of the compression layer.

Further, the present invention relates to a method of producing a frictional power-transmission belt in which a surface of a compression layer is covered with a knitted fabric having an overlapping portion in which one end and another end of the knitted fabric overlap each other, in which the method may include a step of arranging a rubber composition sheet having a thickness of 50 μm to 150 μm between an upper side of the one end of the knitted fabric and a lower side of the other end of the knitted fabric.

When the sheet-shaped rubber composition, which is more excellent in handleability than a case of coating or spraying a mucilage, is arranged between the upper side of the one end of the knitted fabric and the lower side of the other end of the knitted fabric, the productivity can be improved. In addition, when the thickness of the sheet-shaped rubber composition is set to 50 μm to 150 μm, it is possible to minimize the step difference of the overlapping portion, and to prevent problems such as deterioration of appearance quality, abnormal noise, and tension fluctuation, while ensuring sufficient adhesiveness.

Further, the present invention relates to a method of producing a frictional power-transmission belt in which a surface of a compression layer is covered with a knitted fabric having an overlapping portion in which one end and another end of the knitted fabric overlap each other, in which the method may include a step of arranging a molten thermoplastic elastomer between an upper side of the one end of the knitted fabric and a lower side of the other end of the knitted fabric.

The thermoplastic elastomer can be arranged between the upper side of the one end of the knitted fabric and the lower side of the other end of the knitted fabric while freely controlling the shape and amount thereof by taking advantage of the characteristics of thermoplasticity.

Advantageous Effects of Invention

The strength of the joint portion of the knitted fabric (reinforcing cloth) that covers the surface of the compression layer of the frictional power-transmission belt can be improved.

BRIEF DESCRIPTION OF DRAWINGS

FIG. 12 is a diagram showing results of durability tests for Examples 1 to 8.

FIG. 13 is a diagram showing results of durability tests for Comparative Examples 1 and 2.

DESCRIPTION OF EMBODIMENTS

Figure 1:
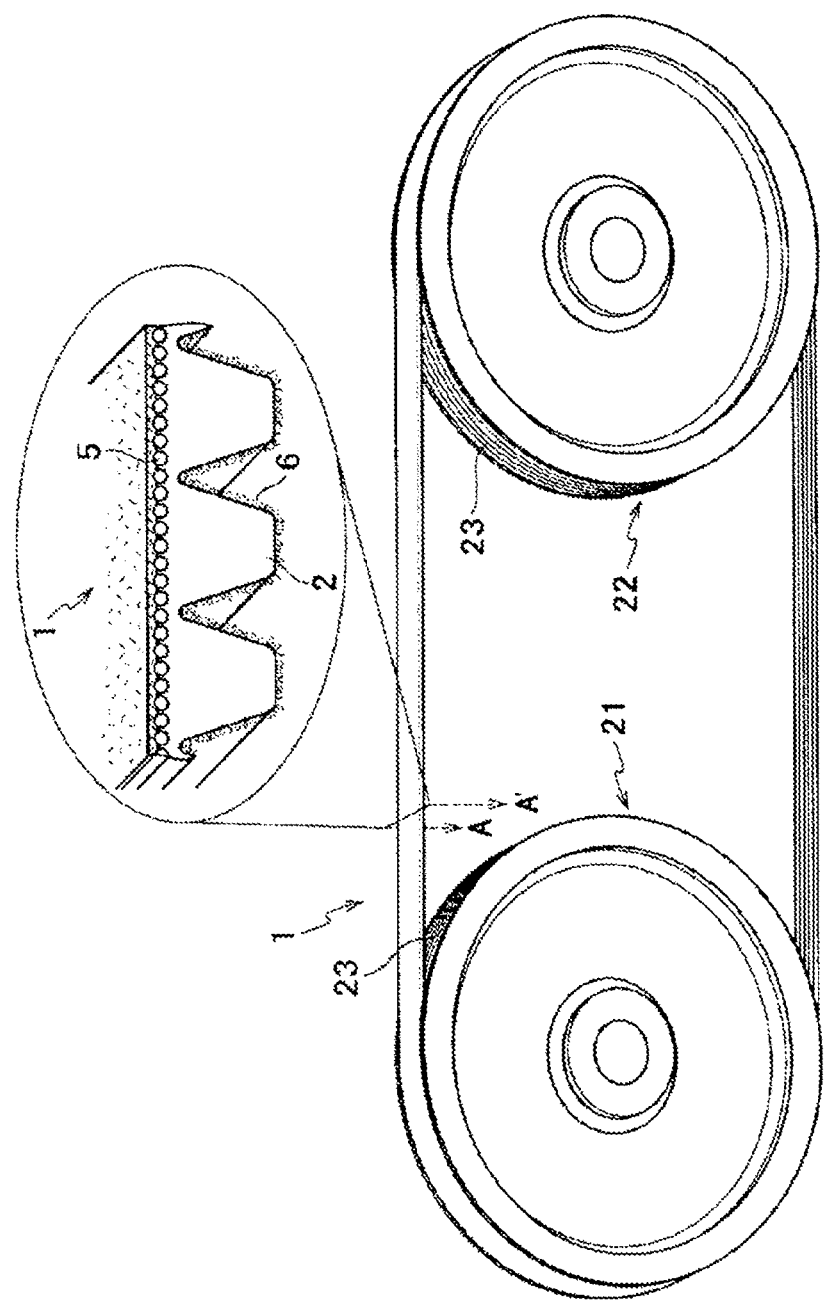
FIG. 1 is a schematic perspective view illustrating an example of a belt power-transmission device using a V-ribbed belt according to the present embodiment.

Hereinafter, an example of an embodiment of the present invention will be described with reference to the drawings. FIG. 1 shows a belt power-transmission device for driving an auxiliary machine using a V-ribbed belt 1 as an example of a frictional power-transmission belt according to the present invention. This belt power-transmission device is the simplest example in which a drive pulley 21 and a driven pulley 22 are provided and the V-ribbed belt 1 is wound between the drive pulley 21 and the driven pulley 22. The endless V-ribbed belt 1 is formed with a plurality of V-shaped rib portions 2 extending in a belt circumferential direction on an inner peripheral side. A plurality of V-shaped grooves 23 into which corresponding rib portions 2 of the V-ribbed belt 1 are fitted are provided on outer peripheral surfaces of the drive pulley 21 and the driven pulley 22.

(Configuration of V-Ribbed Belt 1)

Figure 2:
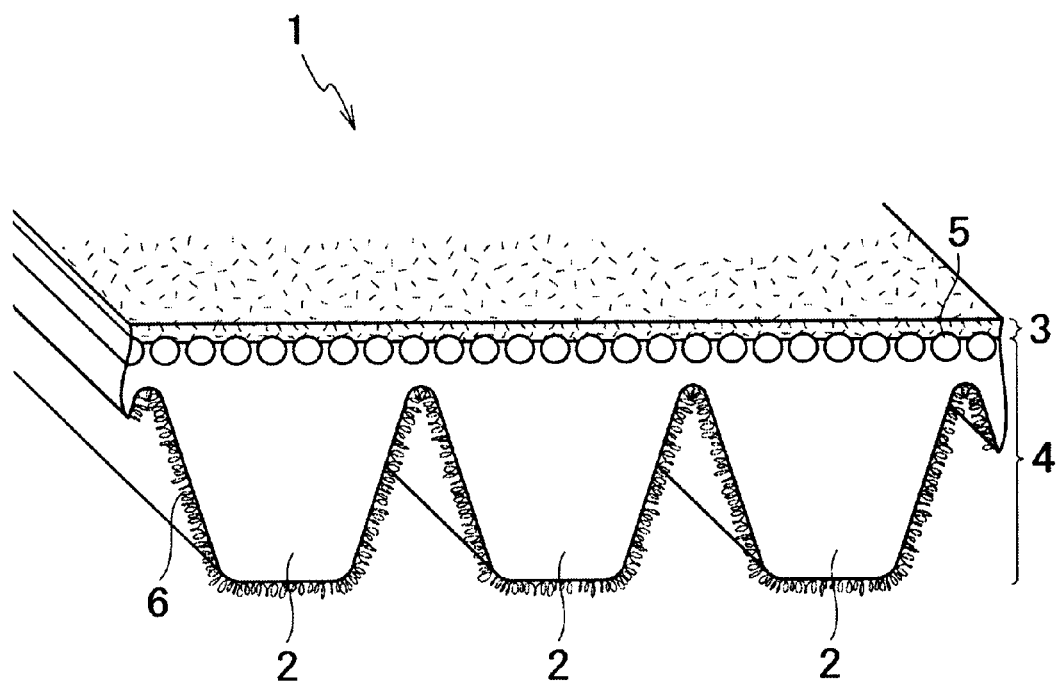
FIG. 2 is a cross-sectional view of the V-ribbed belt along an A-A' cross section in FIG. 1.

As shown in FIG. 2, the V-ribbed belt 1 includes a tension layer 3 forming a belt back surface on an outer peripheral side, a compression layer 4 provided on an inner peripheral side of the tension layer 3, and cords 5 extending in the belt circumferential direction and embedded between the tension layer 3 and the compression layer 4. The plurality of V-shaped rib portions 2 extending in the belt circumferential direction are formed in the compression layer 4, and the surface of the rib portion 2 serving as a frictional power-transmission surface is covered with a knitted fabric 6 having an overlapping portion 62 (see FIG. 3) in which one end and another end of the knitted fabric are overlapped and adhered to each other (details will be described later). The tension layer 3 and the compression layer 4 are both formed of a rubber composition, as will be described later. If necessary, an adhesion layer may be provided between the tension layer 3 and the compression layer 4. This adhesion layer is provided for the purpose of improving the adhesiveness of the cords 5 to the tension layer 3 and the compression layer 4, but is not essential. The form of the adhesion layer may be a form in which the entire cord 5 is embedded in the adhesion layer, or a form in which the cord 5 is embedded between the adhesion layer and the tension layer 3 or between the adhesion layer and the compression layer 4.

(Compression Layer 4)

Examples of a rubber component of the rubber composition forming the compression layer 4 include vulcanizable or crosslinkable rubbers such as diene-based rubbers (such as a natural rubber, an isoprene rubber, a butadiene rubber, a chloroprene rubber, a styrene butadiene rubber, an acrylonitrile butadiene rubber, a hydrogenated nitrile rubber, and a mixed polymer of a hydrogenated nitrile rubber and an unsaturated carboxylic acid metal salt), an ethylene-α-olefin elastomer, a chlorosulfonated polyethylene rubber, an alkylated chlorosulfonated polyethylene rubber, an epichlorohydrin rubber, an acrylic rubber, a silicone rubber, a urethane rubber, and a fluororubber.

Among these, those obtained by forming an unvulcanized rubber layer with a rubber composition containing sulfur and an organic peroxide and vulcanizing or crosslinking the unvulcanized rubber layer are preferred, and particularly an ethylene-α-olefin elastomer (ethylene-α-olefin rubber) is preferred because of being free of harmful halogens, having ozone resistance, heat resistance, and cold resistance, and also being excellent in economy. Examples of the ethylene-α-olefin elastomer include an ethylene-α-olefin rubber and an ethylene-α-olefin-diene rubber. Examples of the α-olefin include propylene, butene, pentene, methylpentene, hexene, and octene. These α-olefins may be used alone or in combination of two or more thereof. Examples of a diene monomer as a raw material therefor include non-conjugated diene monomers such as dicyclopentadiene, methylenenorbornene, ethylidenenorbornene, 1,4-hexadiene, and cyclooctadiene. These diene monomers may be used alone or in combination of two or more thereof.

Representative examples of the ethylene-α-olefin elastomer include an ethylene-α-olefin rubber (ethylene-propylene rubber) and an ethylene-α-olefin-diene rubber (ethylene-propylene-diene copolymer). In the ethylene-α-olefin elastomer, a ratio (mass ratio of the former/the latter) of ethylene to α-olefin may be, for example, in the range of 40/60 to 90/10, preferably 45/55 to 85/15, and more preferably 55/45 to 80/20. The proportion of diene can be selected from the range of 4 mass % to 15 mass %, and may be in the range of, for example, 4.2 mass % to 13 mass %, and preferably 4.4 mass % to 11.5 mass %. The iodine value of the ethylene-α-olefin elastomer containing a diene component may be, for example, in the range of 3 to 40, preferably 5 to 30, and more preferably 10 to 20. When the iodine value is too small, the rubber composition cannot be vulcanized sufficiently and wear or stickiness is likely to occur. When the iodine value is too large, the scorch of the rubber composition becomes short and thus the rubber composition becomes difficult to be handled, and also the heat resistance tends to decrease.

Examples of the organic peroxide for crosslinking the unvulcanized rubber layer include diacyl peroxides, peroxy esters, and dialkyl peroxides (such as dicumyl peroxide, t-butyl cumyl peroxide, 1,1-di-butylperoxy-3,3,5-trimethyl-cyclohexane, 2,5-dimethyl-2,5-di(t-butylperoxy)-hexane, 1,3-bis(t-butylperoxy-isopropyl)benzene, and di-t-butyl peroxide). These organic peroxides may be used alone or in combination of two or more thereof. Further, the organic peroxide preferably has a decomposition temperature for obtaining a half-life of 1 minute of, for example, about 150° C. to 250° C., and preferably about 175° C. to 225° C.

The proportion of a vulcanizing agent or a crosslinking agent (especially an organic peroxide) in the unvulcanized rubber layer may be, for example, 1 to 10 parts by mass, preferably 1.2 to 8 parts by mass, and more preferably 1.5 to 6 parts by mass in terms of solid content with respect to 100 parts by mass of the rubber component (such as an ethylene-α-olefin elastomer).

The rubber composition may contain a vulcanization accelerator. Examples of the vulcanization accelerator include a thiuram-based accelerator, a thiazole-based accelerator, a sulfenamide-based accelerator, a bismaleimide-based accelerator, and a urea-based accelerator. These vulcanization accelerators may be used alone or in combination of two or more thereof. The proportion of the vulcanization accelerator (total amount when a plurality of types of vulcanization accelerators are used in combination) may be, for example, 0.5 to 15 parts by mass, preferably 1 to 10 parts by mass, and more preferably 2 to 5 parts by mass in terms of solid content with respect to 100 parts by mass of the rubber component.

Further, the rubber composition may further contain a co-crosslinking agent (crosslinking aid or co-vulcanizing agent) in order to increase the degree of cross-linking and prevent adhesive wear and the like. Examples of the co-crosslinking agent include common crosslinking aids, such as polyfunctional (iso)cyanurates (such as triallyl isocyanurate and triallyl cyanurate), polydienes (such as 1,2-polybutadiene), unsaturated carboxylic acid metal salts (such as zinc (meth)acrylate and magnesium (meth)acrylate), oximes (such as quinone dioxime), guanidines (such as diphenylguanidine), polyfunctional (meth)acrylates (such as ethylene glycol di(meth)acrylate, butanediol di(meth)acrylate, and trimethylolpropane tri(meth)acrylate), and bismaleimides (such as N,N'-m-phenylene bismaleimide). These crosslinking aids may be used alone or in combination of two or more thereof. The proportion of the crosslinking aid (total amount when a plurality of types of crosslinking aids are used in combination) may be, for example, 0.01 to 10 parts by mass, and preferably 0.05 to 8 parts by mass in terms of solid content with respect to 100 parts by mass of the rubber component.

In addition, the rubber composition may contain a staple fiber, if necessary. Examples of the staple fiber include cellulose-based fibers (cotton, rayon, etc.), polyester-based fibers (PET, PEN fibers, etc.), aliphatic polyamide fibers (6 nylon fiber, 66 nylon fiber, 46 nylon fiber, etc.), aromatic polyamide fibers (p-aramid fiber, m-aramid fiber, etc.), vinylon fibers, and polyparaphenylene benzobisoxazole fibers. These staple fibers may be used alone or in combination of two or more thereof. These staple fibers may be subjected to a common adhesion treatment or surface treatment, for example, treatment with an RFL liquid or the like, in order to enhance the dispersibility or the adhesiveness in the rubber composition. The proportion of the staple fiber (total amount w % ben a plurality of types of staple fibers are used in combination) may be, for example, 1 to 50 parts by mass, preferably 5 to 40 parts by mass, and more preferably 10 to 35 parts by mass with respect to 100 parts by mass of the rubber component.

Further, the rubber composition may contain common additives if necessary, for example, vulcanization aids, vulcanization retarders, reinforcing agents (carbon black, silicon oxide such as hydrous silica, etc.), fillers (clay, calcium carbonate, talc, mica, etc.), metal oxides (zinc oxide, magnesium oxide, calcium oxide, barium oxide, iron oxide, copper oxide, titanium oxide, aluminum oxide, etc.), plasticizers (oils such as paraffin-based oil, naphthene-based oil, and process oil), processing agents or processing aids (stearic acid, stearic acid metal salts, wax, paraffin, fatty acid amide, etc.), anti-aging agents (an antioxidant, an anti-heat aging agent, a bending crack inhibitor, an ozone deterioration inhibitor, etc.), colorants, tackifiers, coupling agents (a silane coupling agent, etc.), stabilizers (a UV absorber, an antioxidant, an ozone deterioration inhibitor, a heat stabilizer, etc.), lubricants (graphite, molybdenum disulfide, ultra high molecular weight polyethylene, etc.), flame retardants, and antistatic agents. The metal oxide may act as a crosslinking agent. These additives may be used alone or in combination of two or more thereof. The proportions of these additives can be selected from the common range depending on the type. For example, with respect to 100 parts by mass of the rubber component, the proportion of the reinforcing agent (carbon black, silica, etc.) may be 10 to 200 parts by mass (preferably 20 to 150 parts by mass), the proportion of the metal oxide (zinc oxide, etc.) may be 1 to 15 parts by mass (preferably 2 to 10 parts by mass), the proportion of the plasticizer (oils such as paraffin oil) may be 1 to 30 parts by mass (preferably 5 to 25 parts by mass), and the proportion of the processing agent (stearic acid, etc.) may be 0.1 to 5 parts by mass (preferably 0.5 to 3 parts by mass).

(Tension Layer 3)

The tension layer 3 may be formed of a rubber composition similar to that of the compression layer 4 (a rubber composition containing a rubber component such as an ethylene-α-olefin elastomer), or may be formed of a cloth (reinforcing cloth) such as a fabric. Examples of the reinforcing cloth include cloth materials such as a woven fabric, a wide-angle fabric, a knitted fabric, and an unwoven fabric. Among these, woven fabrics woven in the form of plain weave, twill weave, satin weave, or the like, wide-angle fabrics in which a crossing angle between warp yarns and weft yarns is about 90° to 130° or knitted fabrics are preferred. As fibers constituting the reinforcing cloth, fibers similar to the above staple fiber can be used. The reinforcing cloth may be subjected to a treatment (such as an immersion treatment) with an RFL liquid and then subjected to a coating treatment or the like to form a rubber-coated fabric.

The tension layer 3 is preferably formed of a rubber composition similar to that of the compression layer 4. As the rubber component of the rubber composition of the tension layer 3, rubber of the same group or same kind as the rubber component of the compression layer 4 is often used. In addition, the proportions of additives such as a vulcanizing agent or a crosslinking agent, a co-crosslinking agent, and a vulcanization accelerator can also be selected respectively from ranges similar to those for the rubber composition of the compression layer 4.

The rubber composition of the tension layer 3 may contain a staple fiber similar to those of the compression layer 4 in order to prevent the generation of abnormal noise due to the adhesion of the back surface rubber during back surface drive. The form of the staple fiber may be a linear shape or a partially bent shape (for example, the milled fiber described in JP-A-2007-120507). When the V-ribbed belt 1 is running, cracks may occur in the tension layer 3 in the belt circumferential direction, and thus the V-ribbed belt 1 may break. However, this can be prevented by orienting the staple fiber in a belt width direction or in a random direction. Further, in order to prevent the generation of abnormal noise during back surface drive, an uneven pattern may be provided on the surface (belt back surface) of the tension layer 3. Examples of the uneven pattern include a knitted fabric pattern, a woven fabric pattern, a cord woven fabric pattern, and an embossed pattern (for example, a dimple shape), and the size and depth thereof are not particularly limited.

(Cord 5)

The cord 5 is not particularly limited, and a cord formed by polyester fibers (polybutylene terephthalate fiber, polyethylene terephthalate fiber, polytrimethylene terephthalate fiber, polyethylene naphthalate fiber, etc.), aliphatic polyamide (nylon) fibers (6 nylon fiber, 66 nylon fiber, 46 nylon fiber, etc.), aromatic polyamide (aramid) fibers (copolyparaphenylene, 3,4'-oxydiphenylene terephthalamide fiber, poly-p-phenylene terephthalamide fiber, etc.), polyarylate fibers, glass fibers, carbon fibers, or PBO fibers can be used. These fibers may be used alone or in combination of two or more thereof. Further, these fibers are appropriately selected according to the expansion coefficient of a flexible jacket 51 to be described later. For example, in the case of high elongation such that the expansion coefficient of the flexible jacket 51 is more than 2%, polyester fibers having a low elastic modulus (particularly low elastic polybutylene terephthalate fiber) and nylon fibers (particularly 66 nylon fibers and 46 nylon fibers) are preferred. This is because for fibers having a high elastic modulus such as aramid fibers and PBO fibers, the fibers cannot be sufficiently elongated even when the flexible jacket 51 expands, the pitch line of the cord 5 embedded in the V-ribbed belt 1 is not stable, or a proper shape of the rib portion 2 is not formed. Therefore, in order to use fibers having a high elastic modulus, it is preferable to set the expansion coefficient of the flexible jacket 51 at low value (for example, about 1%).

(Knitted Fabric 6: Constituent Material)

The knitted fabric 6 may be a weft knit or a warp knit. Since the weft knit is excellent in elasticity, when the knitted fabric 6 is a weft knit, the knitted fabric 6 can more easily accompany the frictional power-transmission surface in which irregularities are formed by the rib portion 2. Examples of those obtained by knitting in a single layer with the weft knit include a stockinet (plain knit), a rib stitch, a tuck stitch, and a pearl stitch. Examples of those obtained by knitting in multiple layers with the weft knit include a smooth knit, an interlock knit, a double rib knit, a single pique knit, a Ponte Roma knit, a milano rib knit, a double jersey knit, and a moss stitch (front moss stitch, back moss stitch, and double moss stitch). Examples of those obtained by knitting in a single layer with the warp knit include a single denbigh and a single cord. Examples of those obtained by knitting in multiple layers with the warp knit include a half tricot, a double denbigh, a double atlas, a double cord, and a double tricot.

In addition, as a yarn for knitting the knitted fabric 6, a yarn composed of a single type of fiber (single yarn) or a yarn composed of a plurality of types of fibers (composite yarn) can be used. Although each of these can be used alone, it is preferable to use them in combination because different characteristics can be imparted to the knitted fabric 6. For example, the knitted fabric 6 may be knitted with a polyester-based composite yarn and a cellulose-based natural spun yarn (for example, cotton yarn). The polyester-based composite yarn is a composite yarn containing a polyester fiber and a fiber other than the polyester fiber. The polyester-based composite yarn may be a bulky textured yarn. The bulky textured yarn is a textured yarn in which the bulk of the cross section is increased by causing the fibers to shrink (crimpability) or by covering a core yarn with another yarn. Examples of the bulky textured yarn include a conjugate yarn, a covering yarn, a crimped textured yarn, a woolly textured yarn, a taslan textured yarn, and an interlaced textured yarn. The polyester-based composite yarn is preferably a conjugate yarn or a covering yarn.

The conjugated yarn has a cross-sectional structure in which two types of polymers are bonded together in a fiber axis direction, and when heat is applied thereto during production or processing, crimping occurs due to the difference in shrinkage ratio between the two polymers, resulting in a bulky yarn. Examples thereof include a conjugate yarn (PTT/PET conjugate yarn) composed of polytrimethylene terephthalate (PTT) and polyethylene terephthalate (PET), and a conjugate yarn (PBT/PET conjugate yarn) composed of polybutylene terephthalate (PBT) and polyethylene terephthalate (PET). The covering yarn is a yarn in which the bulk of the cross section of the entire yarn is increased by covering the periphery of the core yarn with another yarn. Examples thereof include a covering yarn (PET/PU covering yarn) in which a polyurethane (PU) yarn having excellent elasticity is a core and a surface thereof is covered with polyethylene terephthalate (PET), and a covering yarn (PA/PU covering yarn) in which PU is a core and a surface thereof is covered with polyamide (PA). Among these, the polyester-based composite yarn contained in the knitted fabric 6 is preferably a PTT/PET conjugate yarn or a PET/PU covering yarn excellent in elasticity and wear resistance.

Examples of the cellulose-based natural spun yarn include yarns obtained by spinning: natural plant-derived cellulose fibers (pulp fibers) such as bamboo fibers, sugar cane fibers, seed hair fibers (cotton fiber (cotton linter), kapok, etc.), bast fibers (hemp, paper mulberry, *Edgeworthia chrysantha*, etc.) and leaf fibers (Manila hemp, New Zealand hemp, etc.); animal-derived cellulose fibers such as wool, silk and sea squirt cellulose; bacterial cellulose fibers; and algae cellulose. Among these, cotton fibers are particularly preferred because of being excellent in water absorbency.

The knitting ratio of the cellulose-based natural spun yarn is preferably 50 mass % to 95 mass %. Further, the knitted fabric structure of the knitted fabric 6 can be a single layer or multi-layer fabric, and a multi-layer knitted fabric structure is preferred in order to more reliably prevent the rubber of the belt body from seeping out.

By knitting the knitted fabric including the bulky textured yarn, the bulkiness of the knitted fabric can be increased. The bulkiness of the knitted fabric 6 is preferably 2.0 cm$^3$/g or more, and more preferably 2.4 cm$^3$/g or more. The upper limit thereof is not particularly limited, but may be, for example, 4.0 cm$^3$/g or less, or 3.5 cm$^3$/g or less. The bulkiness (cm$^3$/g) is obtained by dividing the thickness (cm) of the knitted fabric 6 by the mass per unit area (g/cm$^2$). Further, in order to more reliably prevent the rubber of the belt body from seeping out to the frictional power-transmission surface, it is also preferable to provide a bulky layer of the knitted fabric on the frictional power-transmission surface.

When the knitted fabric 6 has a multi-layer knitted fabric structure, by arranging a large amount of cellulose-based natural spun yarns having excellent water absorbency in a layer on the frictional power-transmission surface side in the thickness direction of the knitted fabric 6, the water absorbency on the frictional power-transmission surface can be further enhanced. In the case of knitting a multi-layer knitted fabric, by knitting one layer with only the cellulose-based natural spun yarn or with the cellulose-based natural spun yarn and the polyester-based composite yarn, and knitting another layer with only the polyester-based composite yarn, it is also possible to knit a multi-layer knitted fabric in which a large amount of cellulose-based natural spun yarns is arranged on the one layer. By arranging a layer in which a large amount of cellulose-based natural spun yarns is arranged on the frictional power-transmission surface side, the water absorbency on the frictional power-transmission surface can be further enhanced.

A surfactant or a hydrophilic softener can be contained or adhered to the knitted fabric 6 as a hydrophilic treatment agent. In a case where a hydrophilic treatment agent is contained or adhered to the knitted fabric 6, when water droplets stick to the frictional power-transmission surface (knitted fabric 6), the water droplets quickly spread on the surface of the knitted fabric 6 subjected to a hydrophilic treatment to form a water film, and are further absorbed by the cellulose-based natural spun yarn of the knitted fabric 6, thereby eliminating the water film on the frictional power-transmission surface. Therefore, the decrease in friction coefficient of the frictional power-transmission surface in a wet state is further prevented.

As the hydrophilic treatment agent, a surfactant or a hydrophilic softener can be used. As a method of containing or adhering the hydrophilic treatment agent to the knitted fabric, a method of spraying a hydrophilic treatment agent on a knitted fabric, a method of coating a knitted fabric with a hydrophilic treatment agent, or a method of immersing a knitted fabric in a hydrophilic treatment agent can be used. In the case of using a surfactant as a hydrophilic treatment agent, in a belt production method described later, a method can be also adopted in which the surfactant is contained in the knitted fabric by applying the surfactant onto an inner peripheral surface of a tubular outer mold in which a plurality of rib molds are engraved on the inner peripheral surface thereof and then vulcanizing the belt. Among these methods, the method of immersing a knitted fabric in a hydrophilic treatment agent is preferred because the hydrophilic softener can be contained and adhered easily and more uniformly.

The surfactant is a general term for substances that have a hydrophilic group easily compatible with water and a hydrophobic group (lipophilic group) easily compatible with oil in the molecule, and has functions of not only uniformly mixing polar substances and non-polar substances, but the effect of reducing the surface tension to improve wettability, or intervening between substances to reduce the friction at the interface.

The type of the surfactant is not particularly limited, and an ionic surfactant, a nonionic surfactant and the like can be used. The nonionic surfactant may be a polyethylene glycol type nonionic surfactant or a polyhydric alcohol type nonionic surfactant.

The polyethylene glycol type nonionic surfactant is a nonionic surfactant in which ethylene oxide is added to a hydrophobic base component having a hydrophobic group, such as a higher alcohol, an alkyl phenol, a higher fatty acid, a polyhydric alcohol higher fatty acid ester, a higher fatty acid amide and polypropylene glycol, to impart a hydrophilic group thereto.

Examples of the higher alcohol as the hydrophobic base component include $C_{10-30}$ saturated alcohols such as lauryl alcohol, tetradecyl alcohol, cetyl alcohol, octadecyl alcohol and aralkyl alcohol, and $C_{10-26}$ unsaturated alcohols such as oleyl alcohol. Examples of the alkyl phenol include $C_{4-16}$ alkyl phenols such as octyl phenol and nonyl phenol.

Examples of the higher fatty acid as the hydrophobic base component include saturated fatty acids (for example, $C_{10-30}$ saturated fatty acids such as myristic acid, palmitic acid, stearic acid, arachidic acid, behenic acid, lignoceric acid, cerotic acid, and montanoic acid, preferably $C_{12-28}$ saturated fatty acids, more preferably $C_{14-26}$ saturated fatty acids, and particularly preferably $C_{16-22}$ saturated fatty acids; oxycarbonic acids such as hydroxystearic acid; etc.), and unsaturated fatty acids (for example, $C_{10-30}$ unsaturated fatty acids such as oleic acid, erucic acid, erucic acid, linolic acid, linolenic acid, and eleostearic acid, etc.). These higher fatty acids may be used alone or in combination of two or more thereof.

The polyhydric alcohol higher fatty acid ester is an ester of a polyhydric alcohol and the above higher fatty acid, and contains an unreacted hydroxyl group. Examples of the polyhydric alcohol include alkanediols ($C_{2-10}$ alkanediols such as ethylene glycol, propylene glycol and butanediol), alkanetriols (such as glycerin, trimethylolethane, and trimethylolpropane), alkanetetraols (such as pentaerythritol and diglycerine), alkanehexaols (such as dipentaerythritol, sorbitol, and sorbit), alkaneoctaols (such as sucrose), and alkylene oxide adducts thereof (such as $C_{2-4}$ alkylene oxide adducts).

Hereinafter, when "oxyethylene", "ethylene oxide" or "ethylene glycol" is represented by "EO", and "oxypropylene", "propylene oxide" or "propylene glycol" is represented by "PO", specific examples of the polyethylene glycol type nonionic surfactant include: poly EO higher alcohol ethers (poly EO $C_{10-26}$ alkyl ethers such as poly EO lauryl ether and poly EO stearyl ether); $C_{10-26}$ higher alcohol EO-PO adducts such as poly EO poly PO alkyl ethers; alkyl phenol-EO adducts such as poly EO octyl phenyl ether and poly EO nonyl phenyl ether; fatty acid-EO adducts such as poly EO monolaurate, poly EO monooleate, and poly EO monostearate; polyhydric alcohol fatty acid ester-EO adduct such as glycerin mono- or di-higher fatty acid ester-EO adducts (EO adducts of glycerin mono- or di-$C_{10-26}$ fatty acid ester such as glycerin mono- or di-laurate, glycerin mono- or di-palmitate, glycerin mono- or di-stearate, and glycerin mono- or di-olate); pentaerythritol higher fatty acid ester-EO adducts (pentaerythritol mono- to tri-$C_{10-26}$ fatty acid ester-EO adducts such as a pentaerythritol distearate-EO adduct), sorbitan fatty acid ester-EO adducts such as a dipentaerythritol higher fatty acid ester-EO adduct, a sorbitol higher fatty acid ester-EO adduct, a sorbit higher fatty acid ester-EO adduct, poly EO sorbitan monolaurate, poly EO sorbitan monostearate, and poly EO sorbitan tristearate, and a sucrose higher fatty acid ester-EO adduct; higher alkylamine-EO adducts such as poly EO laurylamino ether and poly EO stearylamino ether; fatty acid amide-EO adducts such as poly EO coconut fatty acid monoethanolamide, poly EO lauric acid monoethanolamide, poly EO stearic acid monoethanolanide, and poly EO oleic acid monoethanolamide; oil-EO adducts such as poly EO castor oil and poly EO hardened castor oil; and poly PO-EO adducts (such as a poly EO-poly PO block copolymer). These polyethylene glycol type nonionic surfactants may be used alone or in combination of two or more thereof.

The polyhydric alcohol type nonionic surfactant is a nonionic surfactant in which a hydrophobic group such as higher fatty acid is combined with the above polyhydric alcohol (particularly alkanetriols to alkanehexaols such as glycerol, pentaerythritol, sucrose and sorbitol). Examples of the polyhydric alcohol type nonionic surfactant include glycerin fatty acid esters such as glycerin monostearate and glycerin monooleate, pentaerythritol fatty acid esters such as pentaerythritol monostearate and pentaerythritol di-tallow acid ester, sorbitan fatty acid esters such as sorbitan monolaurate and sorbitan monostearate, sorbitol fatty acid ethers such as sorbitol monostearate, sucrose fatty acid esters, alkyl ethers of polyhydric alcohols, fatty acid amides of alkanolamines such as coconut oil fatty acid diethanolamide, and alkyl polyglycosides. These polyhydric alcohol type nonionic surfactants may be used alone or in combination of two or more thereof, or may be used in combination with the above polyethylene glycol type nonionic surfactant.

The ionic surfactant may be an anionic surfactant such as an alkylbenzene sulfonate, an α-olefin sulfonate, a long-chain fatty acid salt, an alkane sulfonate, an alkyl sulfate, a poly EO alkyl ether sulfuric acid ester salt, a naphthalene sulfonic acid formalin condensate, and an alkyl phosphate, a cationic surfactant such as an alkyltrimethylammonium salt and a dialkyldimethylammonium salt, or an amphoteric surfactant such as an alkyl betaine and an imidazoline derivative.

Preferred surfactants include a nonionic surfactant, particularly a polyethylene glycol type nonionic surfactant (for example, poly EO $C_{10-26}$ alkyl ethers, alkyl phenol-EO adducts, and polyhydric alcohol $C_{10-26}$ fatty acid ester-EO adducts).

The hydrophilic softener as a hydrophilic treatment agent is one obtained by imparting hydrophilicity to a softener used to give flexibility to a fiber member such as a knitted fabric or a woven fabric. A general softener has various effects such as making a fiber member supple, improving slippage, preventing wrinkles, and preventing shrinkage. The hydrophilic softener is slightly inferior to the surfactant in sound resistance when the belt is exposed to water, but can improve the flexibility of the knitted fabric. Therefore, the hydrophilic softener has the effects of preventing wrinkles in the knitted fabric, making it easier to wind the knitted fabric during belt production, and making it easier to attach the knitted fabric to the frictional power-transmission surface on which irregularities are formed by the rib portion 2.

The hydrophilic softener is not particularly limited, and a polyether-modified silicone-based softener or a polyester-based softener can be used. The polyether-modified silicone-based softener is a softener containing silicone modified with a hydrophilic polyether group. The polyether-modified silicone softener may be an emulsion in which silicone is dispersed in water together with a surfactant.

The polyester-based softener is a softener of an emulsion in which a hydrophilic polyester resin is dispersed in water together with a surfactant, and has high affinity with polyester fibers, thereby enhancing the hydrophilicity of the polyester-based composite yarn in the knitted fabric.

In the present embodiment, a surfactant or a hydrophilic softener may be contained or adhered to a part of the knitted fabric 6 by an immersion treatment in which the knitted fabric 6 is immersed in a hydrophilic treatment agent. As the surfactant, a polyethylene glycol type nonionic surfactant may be used, and the concentration of the treatment liquid may be 0.5 mass % to 30 mass %. Further, as the hydrophilic softener, a polyether-modified silicone-based softener and a polyester-based softener may be used, and the concentration of the treatment liquid may be 1 mass % to 10 mass %. The solvent of the treatment liquid containing the hydrophilic treatment agent is not particularly limited, and general-purpose solvents such as water, hydrocarbons, ethers, and ketones can be exemplified. These solvents may be used alone or may be used as a mixed solvent.

In any of the immersion treatments, the immersion time is not particularly limited. The immersion treatment temperature is not particularly limited, and the immersion treatment may be performed at room temperature or under heating. Further, after the immersion treatment, a drying treatment may be performed if necessary. The drying treatment may be performed under heating of, for example, about 50° C. or higher, and preferably about 100° C. or higher.

The knitted fabric 6 may be subjected to an adhesion treatment for the purpose of improving the adhesiveness with the rubber composition forming the compression layer 4 (the rubber composition forming the surface of the rib portion 2). Examples of such an adhesion treatment for the knitted fabric 6 include an immersion treatment in a resin-based treatment liquid in which an epoxy compound or an isocyanate compound is dissolved in an organic solvent (toluene, xylene, methyl ethyl ketone, etc.), an immersion treatment in a resorcin-formalin-latex liquid (RFL liquid), and an immersion treatment in a mucilage in which a rubber composition is dissolved in an organic solvent. As other adhesion treatment methods, for example, a friction treatment in which the knitted fabric 6 and the rubber composition are passed through a calendar roll and thus the rubber composition is imprinted on the knitted fabric 6, a spreading treatment of coating the knitted fabric 6 with a mucilage, and a coating treatment of laminating the rubber composition on the knitted fabric 6. By subjecting the knitted fabric 6 to an adhesion treatment in this way, it is possible to improve the adhesiveness with the compression layer 4 and prevent the knitted fabric 6 from peeling off during the running of the V-ribbed belt 1. In addition, by performing the adhesion treatment, the wear resistance of the rib portion 2 can also be improved.

(Knitted Fabric 6: Adhesion Region 63 and Non-Adhesion Region 64 of Overlapping Portion 62)

The knitted fabric 6 used in the V-ribbed belt 1 of the present embodiment covers the surface of the rib portion 2, which is a frictional power-transmission surface of the V-ribbed belt 1, by subjecting a long knitted fabric 6 to an adhesion treatment, overlapping one end and another end of the knitted fabric 6 subjected to the adhesion treatment (see FIG. 4 and FIG. 5), and adhering an upper surface side of the one end and a lower surface side of the other end of the knitted fabric to each other to prepare a tubular knitted fabric 6, then winding the tubular knitted fabric 6 around an unvulcanized tension layer sheet 3S and an unvulcanized compression layer sheet 4S, and performing vulcanization. The details will be described later in the section of the method of producing the V-ribbed belt 1. The knitted fabric 6 may be configured by adhering one end to another end of a plurality of knitted fabrics, or may be configured by adhering both ends of one knitted fabric.

Figure 3:
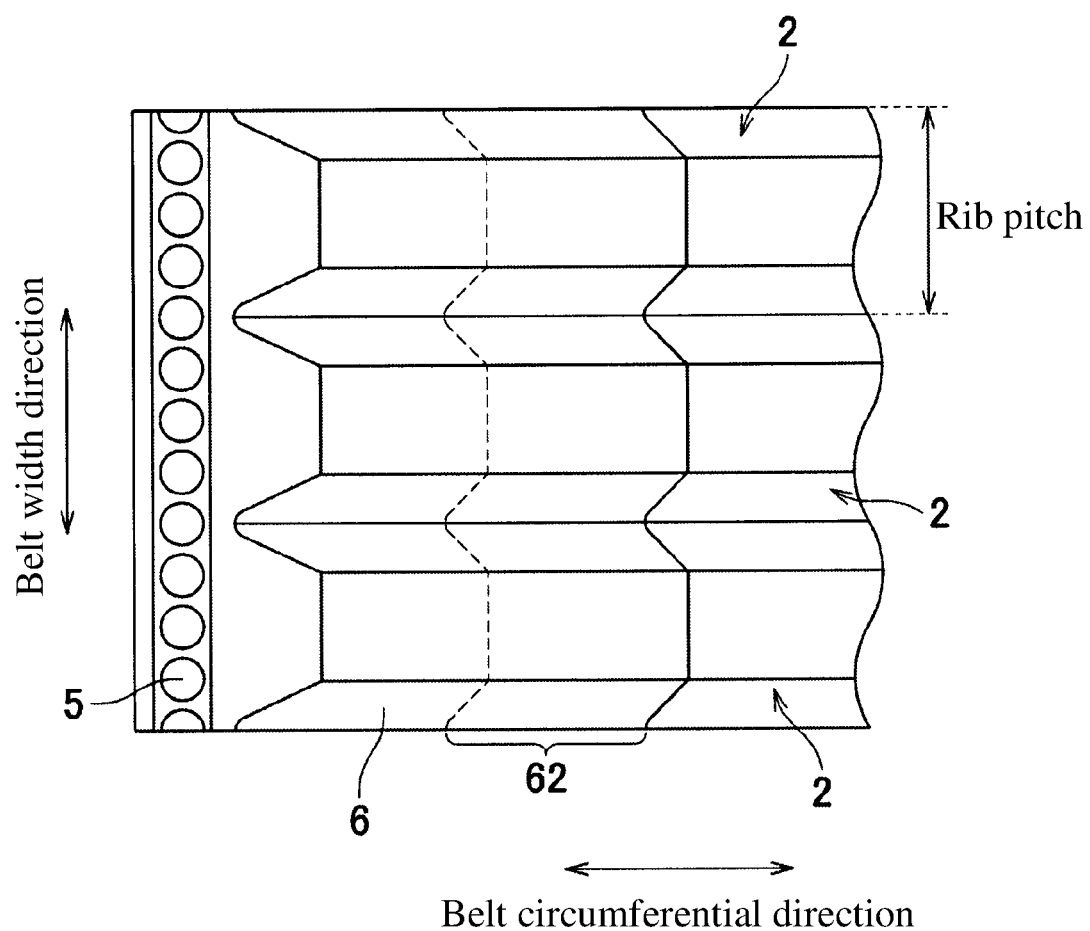
FIG. 3 is an explanatory view showing an overlapping portion of a knitted fabric of the V-ribbed belt according to the present embodiment.
Figure 4:
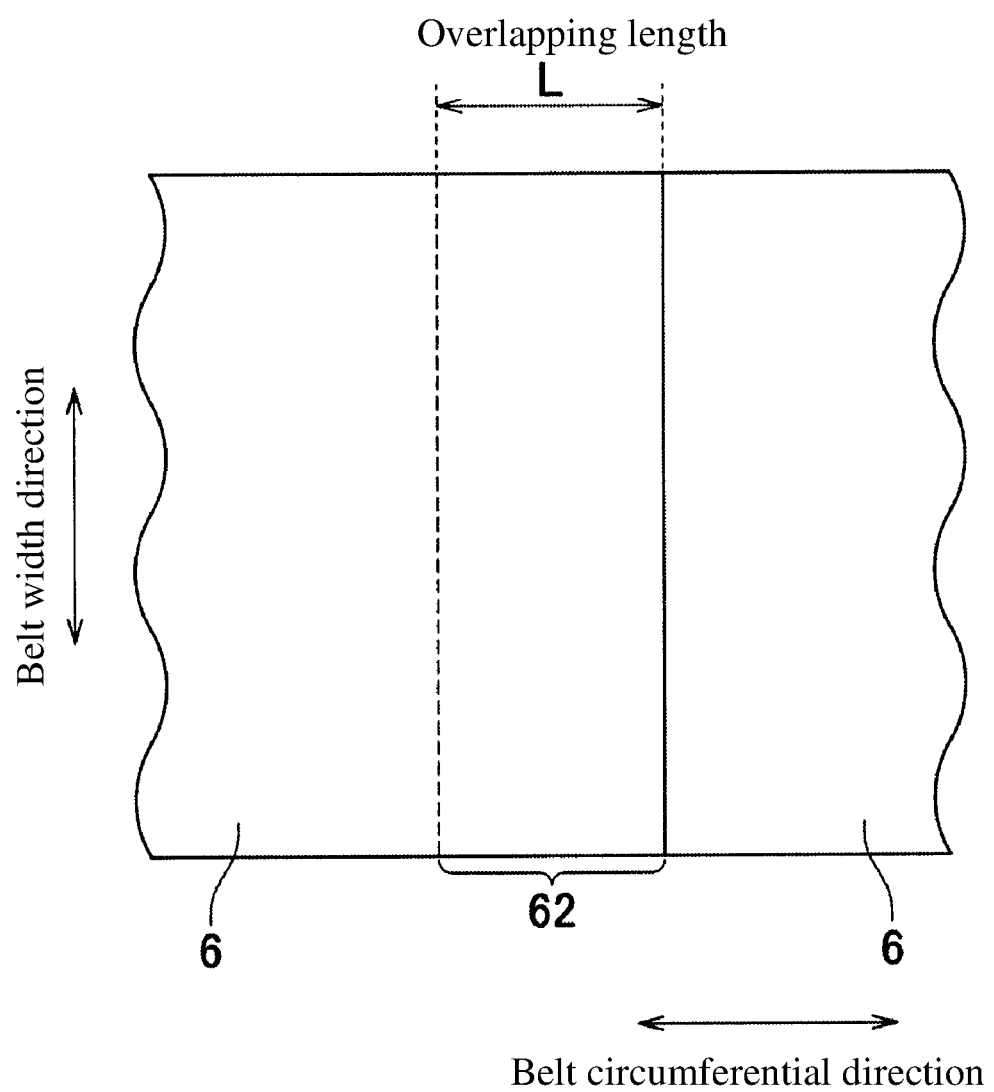
FIG. 4 is an explanatory view showing the overlapping portion of the knitted fabric of the V-ribbed belt according to the present embodiment.
Figure 5:
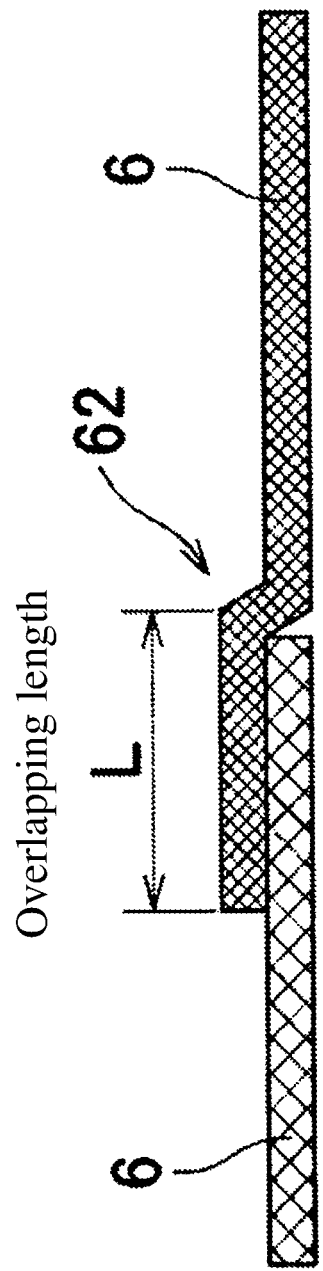
FIG. 5 is an explanatory view showing the overlapping portion of the knitted fabric of the V-ribbed belt according to the present embodiment.

Here, as shown in FIG. 3 to FIG. 5, the knitted fabric 6 used in the V-ribbed belt 1 has the overlapping portion 62 in which one end and another end of the long knitted fabric 6 are overlapped and adhered to each other. The overlapping portion 62 has an adhesion region 63 containing an adhesive component that adheres the upper surface side of one end and the lower surface side of another end of the knitted fabric 6 to each other. In addition to the adhesion region 63, the overlapping portion 62 preferably has a non-adhesion region 64 containing no adhesive component in which the upper surface side of the one end and the lower surface side of the other end of the knitted fabric 6 are not adhered to each other.

An overlapping length L (see FIG. 4 and FIG. 5, the length of the overlapping portion 62 in the belt circumferential direction), which is the length of the overlapping portion in the belt circumferential direction when the ends of the knitted fabric 6 overlap each other, is not particularly limited, and is preferably 2 mm or more and 10 mm or less. When the overlapping length L is less than 2 mm, the effect of increasing the strength of the overlapping portion 62 may not be sufficient, and conversely, when the overlapping length L is more than 10 mm, there is a concern that deterioration of appearance quality, abnormal noise, tension fluctuation, and the like are likely to occur.

Below, modes of the adhesion region 63 and the non-adhesion region 64 in the overlapping portion 62 will be illustrated with reference to FIG. 6 to FIG. 9.

Figure 6:
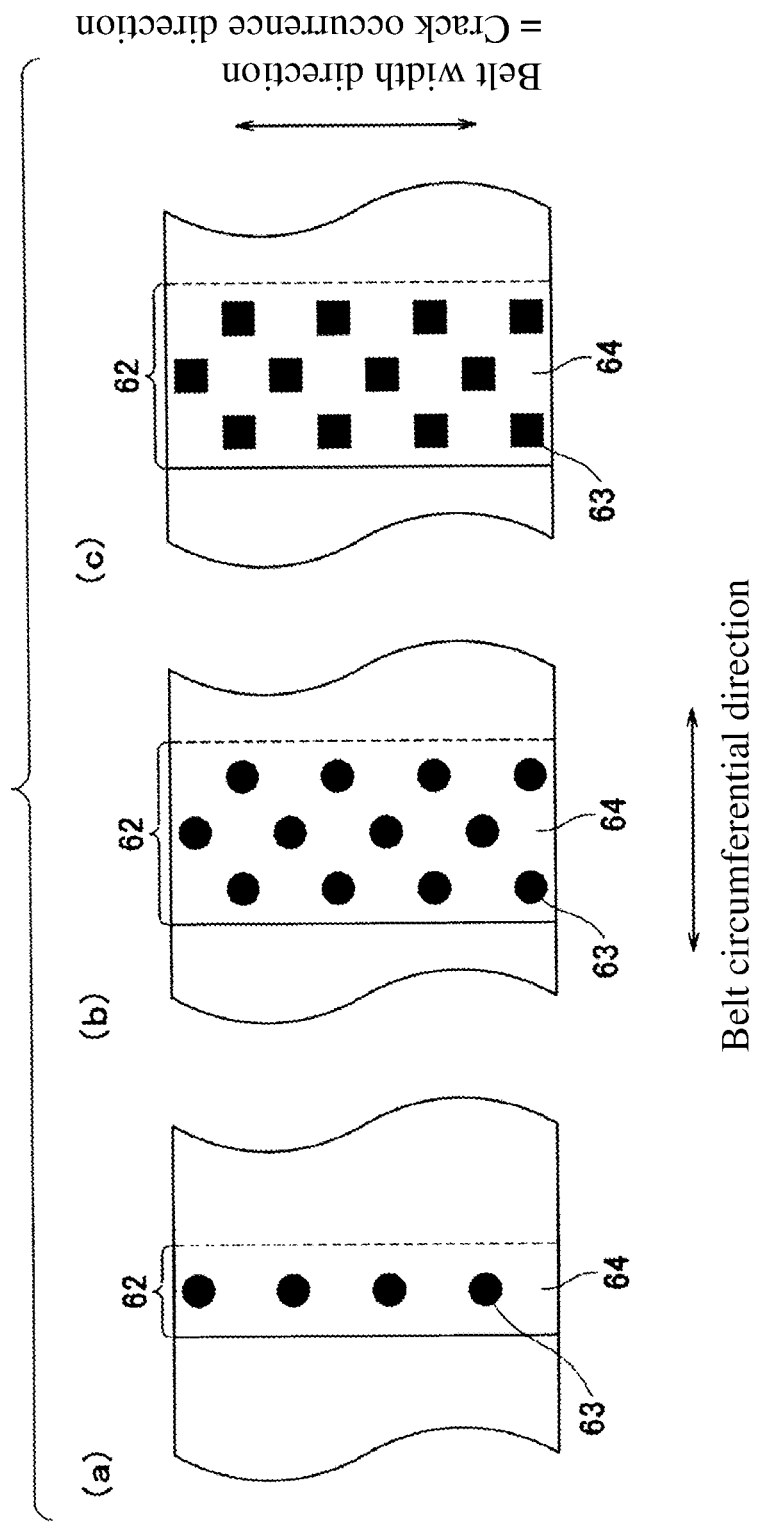
FIG. 6 (*a*) to (*c*) of FIG. 6 are explanatory views exemplifying modes of adhesion regions and non-adhesion regions in the overlapping portion.

For example, the overlapping portion 62 shown in (a) in FIG. 6 has four circular (dot-shaped) adhesion regions 63 provided at a predetermined interval in the belt width direction and the non-adhesion region 64 other than the four adhesion regions 63 in the overlapping portion 62. The upper surface side of one end and the lower surface side of the other end of the knitted fabric 6 are adhered to each other with the adhesive component in the four adhesion regions 63. The number of the circular adhesion regions 63 is not limited to four, and may be less than four or more than four. In addition, the adhesion region 63 is not limited to a circular shape, and may be a quadrangular shape, a triangular shape, or an elliptical shape.

In addition, the overlapping portion 62 shown in (b) in FIG. 6 has four circular adhesion regions 63 provided in a column at an predetermined interval in the belt width direction for three columns in the belt circumferential direction, and the non-adhesion region 64 other than the adhesion regions 63 in the overlapping portion 62. The upper surface side of one end and the lower surface side of the other end of the knitted fabric 6 are adhered to each other with the adhesive component in the 12 adhesion regions 63. In the overlapping portion 62 shown in (b) in FIG. 6, the four circular adhesion regions 63 provided in each column are staggered from the four adhesion regions 63 provided in the adjacent column so as to be alternate when viewed from the belt circumferential direction. The number of circular adhesion regions 63 provided in the belt width direction is not limited to four, and may be less than four or more than four. In addition, the plurality of adhesion regions 63 provided in the belt width direction may be provided in two columns in the belt circumferential direction, or may be provided in more than three columns.

Further, the overlapping portion 62 shown in (c) in FIG. 6 has four square (square dot) adhesion regions 63 provided in a column at an predetermined interval in the belt width direction for three columns in the belt circumferential direction, and the non-adhesion region 64 other than the adhesion regions 63 in the overlapping portion 62. The upper surface side of one end and the lower surface side of the other end of the knitted fabric 6 are adhered to each other with the adhesive component in the 12 adhesion regions 63. In the overlapping portion 62 shown in (c) in FIG. 6, the four square adhesion regions 63 provided in each column are staggered from the four adhesion regions 63 provided in the adjacent column so as to be alternate when viewed from the belt circumferential direction. The adhesion region 63 is not limited to a square shape, and may be a triangular shape or an elliptical shape.

Figure 7:
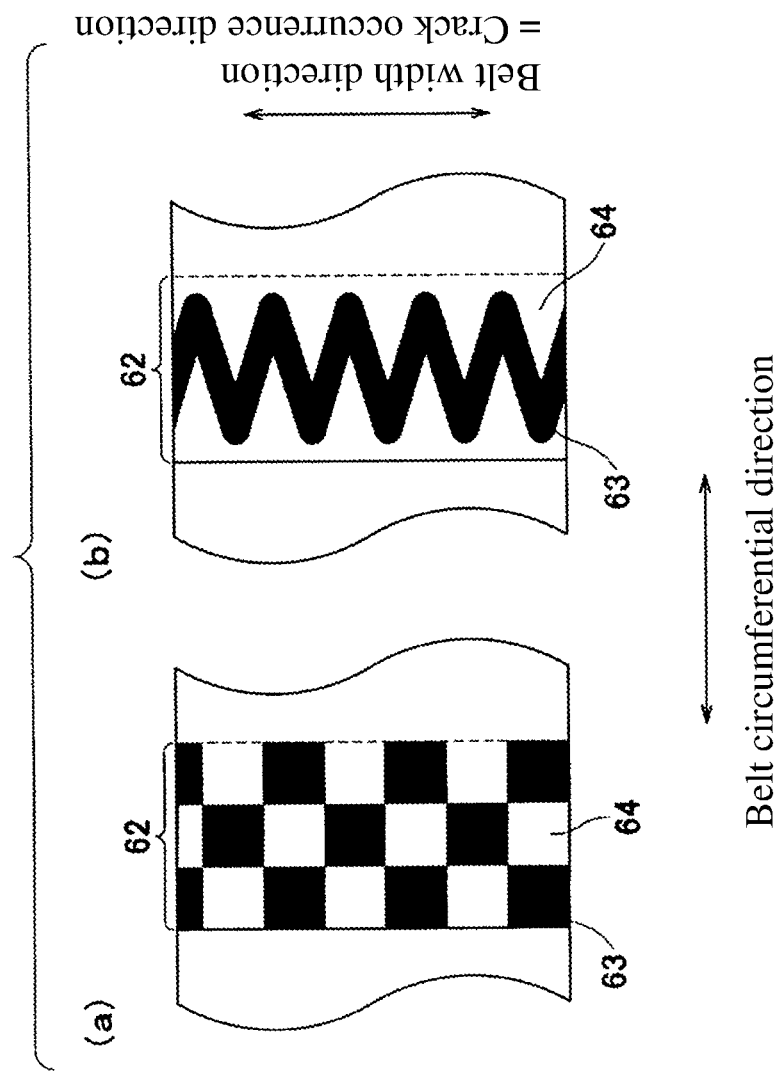
FIG. 7 (*a*) and (*b*) of FIG. 7 are explanatory views exemplifying modes of the adhesion regions and the non-adhesion regions in the overlapping portion.

In the overlapping portion 62 shown in (a) in FIG. 7, a plurality of adhesion regions 63 and a plurality of non-adhesion regions 64 are provided in a checkered pattern. The upper surface side of one end and the lower surface side of the other end of the knitted fabric 6 are adhered to each other with the adhesive component in the plurality of adhesion regions 63.

In addition, in the overlapping portion 62 shown in (b) in FIG. 7, the adhesion region 63 is provided in a wavy shape (or zigzag shape), and the upper surface side of one end and the lower surface side of the other end of the knitted fabric 6 are adhered to each other with the adhesive component in the wavy adhesion region 63.

Figure 8:
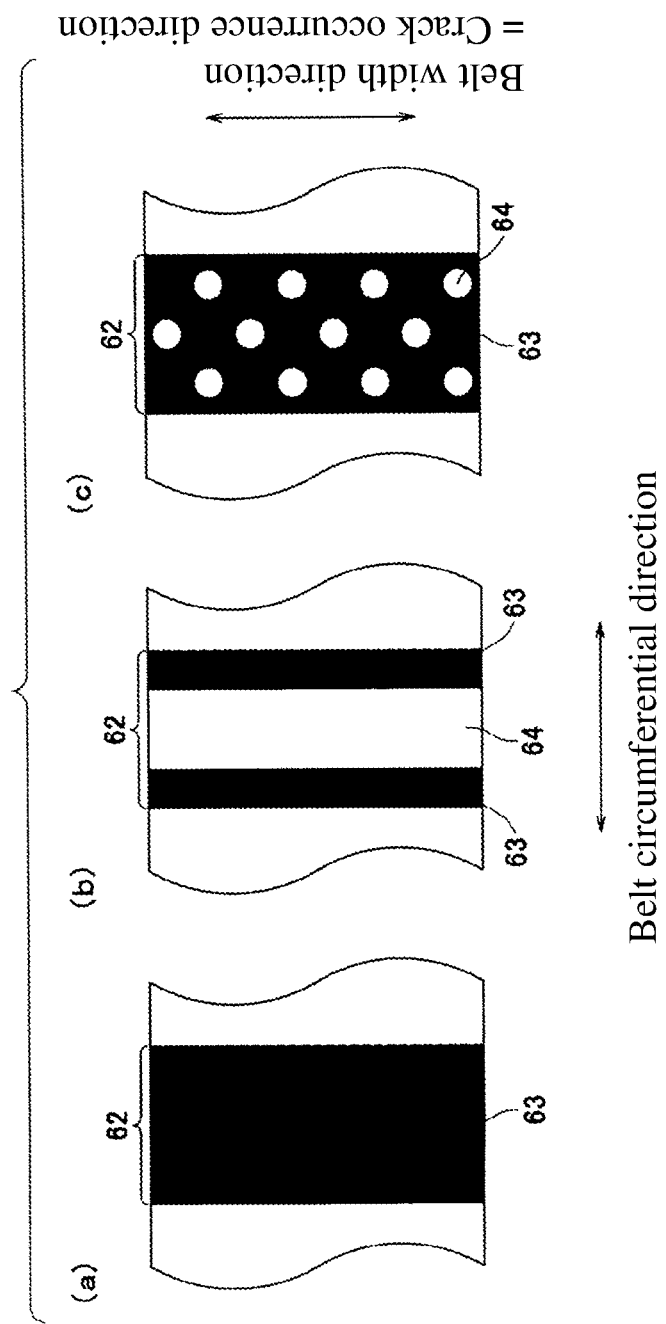
FIG. 8 (*a*) to (*c*) of FIG. 8 are explanatory views exemplifying modes of the adhesion regions and the non-adhesion regions in the overlapping portion.

In the overlapping portion 62 shown in (a) in FIG. 8, the entire portion in which the upper surface side of one end and the lower surface side of the other end of the knitted fabric 6 overlap each other is formed as the adhesion region 63. In this case, the overlapping portion 62 has a configuration that does not have the non-adhesion region 64.

In addition, in the overlapping portion 62 shown in (b) in FIG. 8, two columns of adhesion regions 63 are continuously provided in the belt width direction, and the non-adhesion region 64 is provided between the two columns of adhesion regions 63. The upper surface side of one end and the lower surface side of the other end of the knitted fabric 6 are adhered to each other with the adhesive component in the two columns of adhesion regions 63. The overlapping portion 62 is not limited to the two columns of adhesion regions 63, and may have one column or three or more columns of adhesion regions 63 in the belt width direction.

Further, the overlapping portion 62 shown in (c) in FIG. 8 has four circular non-adhesion regions 64 provided in a column at an predetermined interval in the belt width direction for three columns in the belt circumferential direction, and the adhesion region 63 other than the non-adhesion regions 64 in the overlapping portion 62. The upper surface side of one end and the lower surface side of the other end of the knitted fabric 6 are adhered to each other with the adhesive component in the adhesion region 63. In the overlapping portion 62 shown in (c) in FIG. 8, the four circular non-adhesion regions 64 provided in each column are staggered from the four non-adhesion regions 64 provided in the adjacent column so as to be alternate when viewed from the belt circumferential direction. The number of circular non-adhesion regions 64 provided in the belt width direction is not limited to four, and may be less than four or more than four. In addition, the plurality of non-adhesion regions 64 provided in the belt width direction may be provided in less than three columns in the belt circumferential direction, or may be provided in more than three columns.

Figure 9:
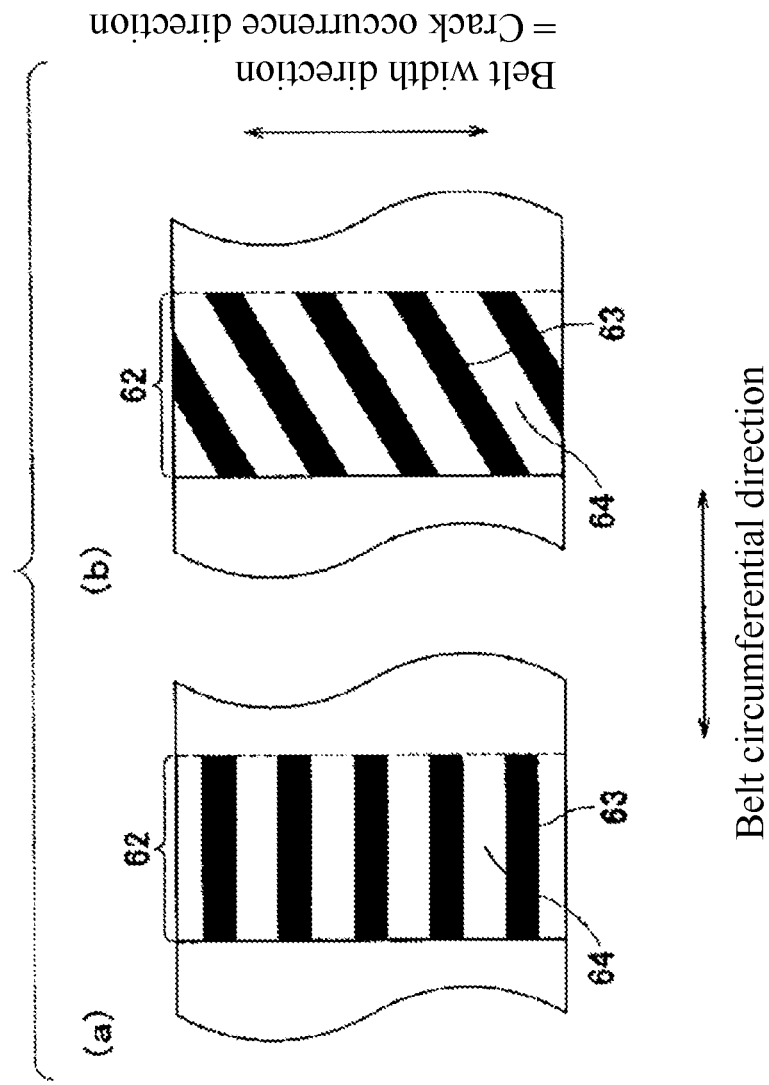
FIG. 9 (*a*) and (*b*) of FIG. 9 are explanatory views exemplifying modes of the adhesion regions and the non-adhesion regions in the overlapping portion.

In the overlapping portion 62 shown in (a) in FIG. 9, adhesion regions 63 (5 lines) and non-adhesion regions 64 (6 lines), which are continuously provided in the belt circumferential direction, are alternately provided, and the upper surface side of one end and the lower surface side of the other end of the knitted fabric 6 are adhered to each other with the adhesive component in the adhesion regions 63. The overlapping portion 62 is not limited to having five lines of adhesion regions 63, and may have four or less lines of adhesion regions 63 or six or more lines of adhesion regions 63 in the belt circumferential direction.

In addition, in the overlapping portion 62 shown in (b) in FIG. 9, five adhesion regions 63 and six non-adhesion regions 64, which are diagonally and continuously provided in the belt circumferential direction, are alternately provided, and the upper surface side of one end and the lower surface side of the other end of the knitted fabric 6 are adhered to each other with the adhesive component in the adhesion regions 63. The overlapping portion 62 is not limited to having five adhesion regions 63, and may have four or less adhesion regions 63 or six or more adhesion regions 63, which are diagonally and continuously provided in the belt circumferential direction.

The effects of the mode of the adhesion region 63 and the non-adhesion region 64 on the above overlapping portion 62 will be described below.

When the knitted fabric 6 covering the surface of the compression layer 4 of the V-ribbed belt 1 is joined by butt without the overlapping portion 62, it is difficult to sufficiently increase the strength of a joint portion of the knitted fabric 6, cracks occur in the joint portion, and thus the knitted fabric 6 is likely to be peeled off from the surface of the compression layer 4. In addition, even when the knitted fabric 6 has the overlapping portion 62, if there is no adhesion region 63, the strength of the joint portion of the knitted fabric 6 is not sufficient by only the adhesive component contained in the knitted fabric 6, and similarly, the knitted fabric 6 is likely to be peeled off from the surface of the compression layer 4. Therefore, when the adhesion region 63 in which the upper surface side of one end and the lower surface side of the other end of the knitted fabric 6 are adhered to each other is provided in the overlapping portion 62, the joint portion can be reinforced to prevent the knitted fabric 6 from peeling off from the surface of the compression layer 4.

In addition, as shown in (a) in FIG. 8, when the entire overlapping portion 62 in which the one end and the other end of the knitted fabric 6 overlap each other has the adhesion region 63 but no non-adhesion region 64 exists, the knitted fabric 6 is strongly restrained and thus the elasticity of the knitted fabric 6 is reduced. As a result, stress is concentrated on the joint portion of the overlapping portion when the V-ribbed belt 1 is bent, and there is a concern that cracks are likely to occur in the compression layer 4. Therefore, when the non-adhesion region 64, together with the adhesion region 63, is provided in the overlapping portion 62, it is possible to alleviate the stress concentration and prevent the occurrence of cracks in the compression layer 4 while making the adhesive force between the one end and the other end of the knitted fabric 6 sufficient. As a result, the life of the V-ribbed belt 1 is improved.

Further, according to a configuration in which the adhesion region 63 is not continuously provided in the belt width direction, as the overlapping portions 62 shown in (a) to (c) in FIG. 6, (a) and (b) in FIG. 7, and (a) and (b) in FIG. 9, the non-adhesion region 64 is always provided in the belt width direction in which the adhesion region 63 is provided (the adhesion regions 63 and the non-adhesion regions 64 are alternately provided in the belt width direction), so that it is possible to alleviate the stress concentration over the entire belt width direction at a specific portion of the overlapping portion 62 in the belt circumferential direction, and to prevent the occurrence of cracks in the compression layer 4.

Further, the adhesion regions 63 and the non-adhesion regions 64 are alternately provided in a checkered pattern, as the overlapping portion 62 shown in (a) in FIG. 7, so that it is possible to alleviate the stress concentration over the entire belt width direction at a specific portion of the overlapping portion 62 in the belt circumferential direction, and to prevent the occurrence of cracks in the compression layer 4.

Furthermore, the adhesion region 63 is provided in a wavy shape or a zigzag shape, as the overlapping portion 62 shown in (b) in FIG. 7, so that it is possible to alternately provide the adhesion regions 63 and the non-adhesion regions 64 in the overlapping portion 62, to alleviate the stress concentration over the entire belt width direction at a specific portion of the overlapping portion 62 in the belt circumferential direction, and to prevent the occurrence of cracks in the compression layer 4.

The total area of the adhesion regions 63 in the overlapping portion 62 shown in (a) to (c) in FIG. 6, (a) and (b) in FIG. 7, (b) in FIG. 8, and (a) and (b) in FIG. 9 is preferably 10% to 50% of the area of the overlapping portion 62. When the total area of the adhesion regions 63 is less than 10% of the area of the overlapping portion 62, there are concerns that the strength of the joint portion of the overlapping portion 62 in the knitted fabric 6 cannot be sufficiently increased, cracks occur in the joint portion, and thus the knitted fabric 6 is peeled off from the surface of the compression layer 4. On the other hand, when the total area of the adhesion regions 63 is more than 50% of the area of the overlapping portion 62, there are concerns that the knitted fabric 6 is restrained more strongly than necessary, the elasticity of the knitted fabric 6 is reduced, stress is concentrated on the joint portion of the overlapping portion when the V-ribbed belt 1 is bent, and thus cracks are likely to occur in the compression layer 4. Therefore, when the total area of the adhesion regions 63 is set to 10% to 50% of the area of the overlapping portion 62, it is possible to maintain the elasticity of the knitted fabric 6 and prevent the knitted fabric 6 from peeling off from the surface of the compression layer 4 and the occurrence of cracks in the compression layer 4 in a well-balanced manner, while sufficiently increasing the strength of the joint portion of the overlapping portion 62.

(Adhesive Component in Adhesion Region 63)

As the adhesive component in the adhesion region 63, a rubber component, a thermoplastic elastomer, or the like can be mainly used.

As an example of the rubber component as the adhesive component in the adhesion region 63, the rubber component described as the rubber component forming the compression layer 4 can be used. In particular, using a rubber component of a kind similar to (particularly the same as) the rubber component forming the compression layer 4 is preferred because the adhesion region 63 can be similarly deformed with the deformation of the compression layer 4, thereby alleviating stress concentration. Using the rubber composition for forming the compression layer 4 as the above adhesive component without change is particularly preferred because it is not necessary to prepare a new rubber composition for the adhesive component in the adhesion region 63.

Since the adhesive component in the adhesion region 63 is provided in the overlapping portion 62 of the knitted fabric 6, it is preferable to reduce the thickness, and specifically, the thickness is preferably about 50 µm to 150 µm. As a method of providing the adhesion region 63 having such a thickness, a method of preparing a rubber composition sheet thinly spread to the above thickness in advance, or a method of dissolving a rubber composition in a solvent (toluene or the like) to prepare a mucilage and then coating or spraying the mucilage to adhere to the knitted fabric 6 can be considered. The method of using the mucilage takes time and effort for drying after coating and thus may reduce the productivity. Therefore, the method of preparing a rubber composition sheet in advance is preferable. As a method of preparing a rubber composition sheet, the rubber composition sheet may be prepared by dissolving a rubber composition in a solvent to prepare a mucilage, thinly spreading the mucilage on a mold release paper, and then performing drying.

As an example of the thermoplastic elastomer (thermoplastic resin) serving as the adhesive component in the adhesion region 63, a general-purpose thermoplastic elastomer can be used. Specific examples thereof include polyethylene, polypropylene, polystyrene, polyvinyl chloride, and polyurethane. Among these, a thermoplastic elastomer having a flow start point (or softening point) of about 100° C. to 160° C. is preferred from the viewpoints that it is easy to melt at a relatively low temperature and adhere to the knitted fabric 6, and it is easy to melt also during vulcanization of the V-ribbed belt 1 and penetrate into the inside of the knitted fabric 6 to improve the adhesive force. In particular, a thermoplastic polyurethane is preferably used because of not containing halogen and having excellent adhesive force and strength. The thermoplastic polyurethane may be ether-based or ester-based, and may be selected in consideration of strength and water resistance. As described above, the production cost of the belt can be reduced by using the highly versatile thermoplastic polyurethane for the thermoplastic elastomer used for the adhesive component in the adhesion region 63.

As described above, the thermoplastic elastomer serving as the adhesive component in the adhesion region 63 preferably has a flow start point of 100° C. or higher and 160° C. or lower. When the flow start point of the thermoplastic elastomer is lower than 100° C., there are concerns that the strength of the adhesion region 63 is reduced during the use of the V-ribbed belt 1, and the knitted fabric 6 is likely to be peeled off. In addition, when the flow start point of the thermoplastic elastomer is 160° C. or lower, during the vulcanization of the V-ribbed belt 1, the thermoplastic elastomer softens to improve the adhesion to the knitted fabric 6 and improve the adhesive force. However, when the flow start point is higher than 160° C., there are concerns that the above effects are not obtained and the adhesive force is not sufficiently improved. Therefore, it is preferable that the thermoplastic elastomer used in the adhesion region 63 has the flow start point in the range of 100° C. or higher and 160° C. or lower.

Further, as a method of adhering the thermoplastic elastomer to the knitted fabric 6, the melted thermoplastic elastomer may be directly adhered to the knitted fabric 6 by using a general-purpose dispenser (glue gun, hot melt gun) or the like. As described above, when a thermoplastic elastomer is used for the adhesive component in the adhesion region 63, the occurrence of cracks in the compression layer 4 can be prevented as compared with a case where a rubber composition is used for the adhesive component in the adhesion region 63.

In addition, examples of the adhesive component in the adhesion region 63 include thermosetting elastomers (thermosetting resins) and various general-purpose adhesives (for example, reactive adhesives such as an acrylic resin, an epoxy resin, and a urethane resin, and solution-based adhesives such as an ethylene-vinyl acetate resin (EVA), a phenol resin, and a melamine resin). When a thermosetting elastomer or a solution-based adhesive is used as the adhesive component in the adhesion region 63, the curing reaction and solvent removal can be promoted by utilizing the heat applied during the vulcanization, so that the adhesive force of the adhesion region 63 can be improved and the process can be simplified.

Further, as the adhesive component in the adhesion region 63, a rubber composition in which a cellulose nanofiber (CNF) is dispersed may be used. In this case, the durable life can be improved as compared with the case where a rubber composition in which CNF is not dispersed is used. Further, as the adhesive component in the adhesion region 63, a thermoplastic polyurethane (TPU) in which CNF is dispersed may be used. In this case, the durable life can be improved as compared with the case where a thermoplastic polyurethane in which CNF is not dispersed is used.

The CNF used here is produced by finely unraveling cellulose, which is the main component of the cell wall of a plant, to a nano size. Examples of the raw material cellulose include wood pulp, rice straw, and wheat straw. The CNF can be classified into cellulose microfibrils having a width of about 4 nm (single cellulose nanofibers), cellulose microfibril bundles having a width of about 10 nm to 20 nm, which are bundles of several single cellulose nanofibers, and microfibrillated celluloses (MFC) having a width of several tens to several hundred nm, in which cellulose microfibril bundles are further converged. Any CNF among these CNFs may be used, and a CNF in which these CNFs are mixed may be used. As the CNF, a CNF that has been chemically modified to prevent aggregation can be preferably used. Examples of the method of chemical modification include TEMPO oxidation and carboxymethylation.

Further, as a method of dispersing the CNF in the rubber composition and TPU, a homogenizer method can be used. Examples of the homogenizer method include an ultrasonic method, a stirring method, and a high pressure method. When the CNF is dispersed in the rubber composition, a method of dissolving the rubber composition in a solvent to prepare a mucilage, adding the CNF to the mucilage, and then dispersing the CNF by a homogenizer method can be exemplified. When the CNF is dispersed in the TPU, a method of adding the CNF to the heat-melted TPU and then dispersing the CNF by a homogenizer method can be exemplified. Alternatively, an aqueous dispersion in which CNF is dispersed in water may be used. In this case, for example, an aqueous dispersion in which the CNF is dispersed in water is coated onto the knitted fabric 6 and dried, and then the adhesive component is provided in the adhesion region 63. Next, the adhesion region 63 is hot-pressed (100° C. 20 seconds) to integrate the CNF and the adhesive component.

The concentration of the CNF in the adhesive component and the aqueous dispersion is preferably about 0.01 mass % to 2 mass %. This is because when the concentration is less than 0.01 mass %, the adhesive force is not sufficiently improved, and when the concentration is more than 2 mass %, it is difficult to uniformly disperse the CNF.

As described above, it is preferable to use an adhesive component other than an isocyanate in the adhesion region 63. The knitted fabric 6 is impregnated with an isocyanate to improve the wear resistance and the adhesiveness, and an adhesive component different from the isocyanate impregnated in the knitted fabric 6 is used in the adhesion region 63, so that a sufficient adhesive force can be ensured at the joint portion of the overlapping portion 62, and the knitted fabric 6 can be prevented from peeling off from the surface of the compression layer 4 starting from the overlapping portion 62.

(Method of Producing V-ribbed Belt 1)

Hereinafter, a method of producing the V-ribbed belt 1 will be described. First, the long knitted fabric 6 is subjected to an adhesion treatment. Then, one end and another end of the knitted fabric 6 that has been subjected to the adhesion treatment are overlapped each other (see FIG. 5: overlapping portion 62), and a step (adhesion step) of adhering the upper surface side of the one end and the lower surface side of the other end of the knitted fabric 6 to each other via the adhesion region 63 is performed, thereby preparing a tubular knitted fabric 6.

In the adhesion step, a rubber composition having components same as those of the compression layer 4 is dissolved in a solvent (toluene or the like) to prepare a mucilage, the prepared mucilage is coated or sprayed onto and adhered on the upper surface side of the one end of the knitted fabric 6 to form the adhesion region 63, and then the lower surface side of the other end of the knitted fabric 6 is overlapped with the upper surface side of the one end of the knitted fabric 6, thereby adhering the upper surface side of the one end and the lower surface side of the other end of the knitted fabric 6 to each other via the adhesion region 63. Accordingly, the joint portion of the overlapping portion 62 can be reinforced to prevent the knitted fabric 6 from peeling off from the surface of the compression layer 4. Alternatively, the prepared mucilage may be coated or sprayed onto and adhered on the lower surface side of the one end of the knitted fabric 6, and the upper surface side of the other end of the knitted fabric 6 is overlapped with the lower surface side of the one end of the knitted fabric 6, thereby adhering the lower surface side of the one end and the upper surface side of the other end of the knitted fabric 6 to each other via the adhesion region 63.

As another method in the above adhesion step, a rubber composition sheet having a thickness of 50 μm to 150 μm may be provided as the adhesion region 63 between the upper surface side of the one end of the knitted fabric 6 and the lower surface side of the other end of the knitted fabric 6, thereby adhering the upper surface side of the one end and the lower surface side of the other end of the knitted fabric 6 to each other via the adhesion region 63. Accordingly, when the sheet-shaped rubber composition, which is more excellent in handleability than a case of coating or spraying a mucilage, is provided between the upper surface side of the one end of the knitted fabric 6 and the lower surface side of the other end of the knitted fabric 6, the productivity can be improved. In addition, when the thickness of the sheet-shaped rubber composition is set to 50 μm to 150 μm, it is possible to minimize the step difference of the overlapping portion 62, and to prevent problems such as deterioration of appearance quality, abnormal noise, and tension fluctuation, while ensuring sufficient adhesiveness.

As another method in the above adhesion step, the thermoplastic elastomer, while being melted, may be provided as the adhesion region 63 between the upper surface side of the one end of the knitted fabric 6 and the lower surface side of the other end of the knitted fabric 6, thereby adhering the upper surface side of the one end and the lower surface side of the other end of the knitted fabric 6 to each other via the adhesion region 63. Accordingly, the adhesion region 63 can be provided between the upper surface side of the one end of the knitted fabric 6 and the lower surface side of the other end of the knitted fabric 6 while freely controlling the shape and amount thereof by taking advantage of the characteristics of thermoplasticity of the thermoplastic elastomer.

Figure 10:
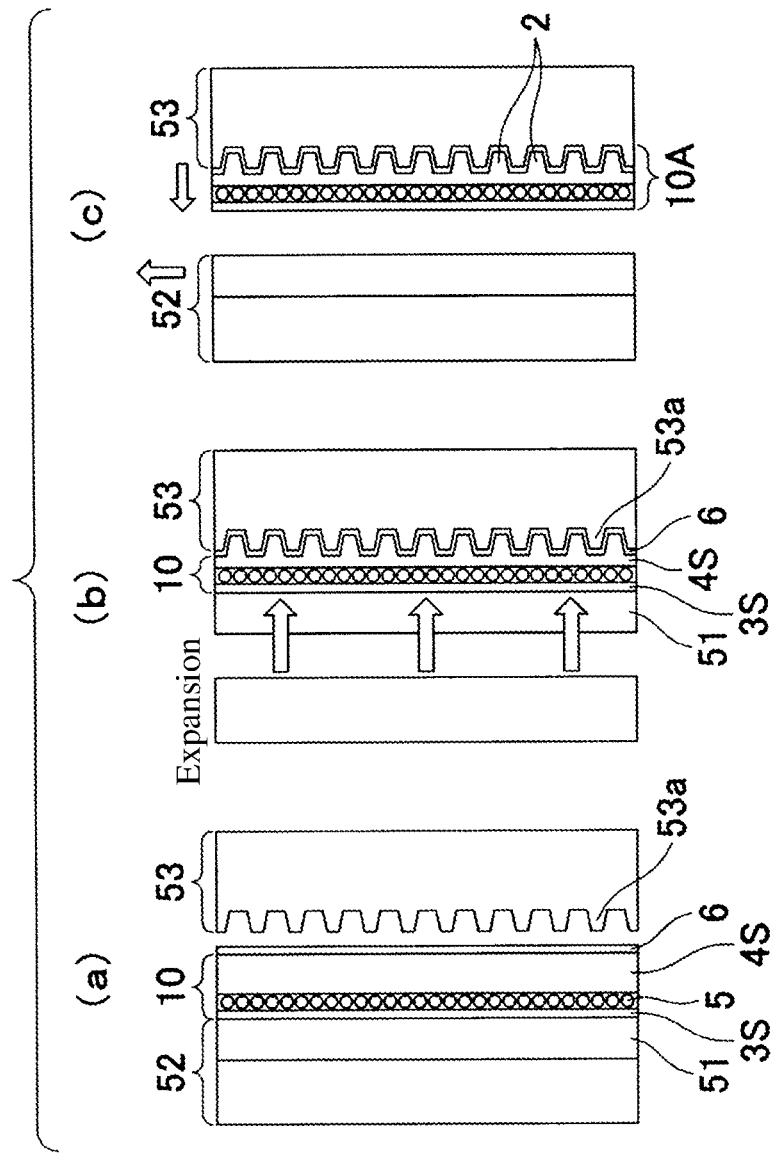
FIG. 10 (*a*) to (*c*) of FIG. 10 are schematic diagrams illustrating a method of producing a V-ribbed belt.

Next, as shown in (a) in FIG. 10, an unvulcanized tension layer sheet 3S is wound around an inner mold 52 having a flexible jacket 51 mounted on the outer peripheral surface thereof, a cord 5 is spirally spun thereon, and then an unvulcanized compression layer sheet 4S and the tubular knitted fabric 6 prepared through the above adhesion step are sequentially wound therearound, thereby preparing a formed body 10. Thereafter, the inner mold 52 around which the formed body 10 is wound is concentrically set on the inner peripheral side of an outer mold 53 in which a plurality of rib molds 53a are engraved on the inner peripheral surface thereof. At this time, a predetermined gap is provided between the inner peripheral surface of the outer mold 53 and the outer peripheral surface of the formed body 10.

Then, as shown in (b) in FIG. 10, the flexible jacket 51 is expanded toward the inner peripheral surface of the outer mold 53 at a predetermined expansion coefficient (for example, 1% to 6%), the compression layer sheet 4S and the knitted fabric 6 of the formed body 10 are press-fitted into the rib mold 53a of the outer mold 53, and then vulcanization (for example, 160° C. 30 minutes) is performed in this state.

Finally, as shown in (c) in FIG. 10, the inner mold 52 is removed from the outer mold 53, a vulcanized rubber sleeve 10A having a plurality of rib portions 2 is removed from the outer mold 53, and then the vulcanized rubber sleeve 10A is cut to a predetermined width along the circumferential direction using a cutter to finish the V-ribbed belt 1. The method of producing the V-ribbed belt 1 is not limited to the above method, and for example, other known methods such as one disclosed in JP-A-2004-82702 can be adopted.

OTHER EMBODIMENTS

In the above embodiment, the V-ribbed belt 1 has been described as an example of the frictional power-transmission belt, but the content of the present invention can be adopted by a flat belt, a V-belt, or the like as long as it is a frictional power-transmission belt.

EXAMPLES

Next, V-ribbed belts for Examples 1 to 8 and Comparative Examples 1 and 2 having overlapping portions adhered in the shape of the adhesion region shown in FIG. 12 and FIG. 13 were prepared and subjected to a durability test.

The materials and configurations of the V-ribbed belts of Examples 1 to 8 and Comparative Examples 1 and 2 will be described below.

Table 1 shows the composition of the rubber composition used as the tension layer, the compression layer and the adhesive component in the adhesion region of the V-ribbed belt of Examples 1 to 8 and Comparative Examples 1 and 2.

TABLE 1

(Rubber compositions constituting tension layer, compression layer and adhesive components in adhesion region)

| Material | Rubber for tension layer | Rubber for compression layer Rubber for adhesive component |
|---|---|---|
| EPDM polymer | 100 | 100 |
| Zinc oxide | 5 | 5 |
| Stearic acid | 1 | 1 |
| Carbon black HAF | 80 | 80 |
| Paraffin-based oil | 0 | 10 |
| Anti-aging agent | 2 | 2 |
| Organic peroxide | 5 | 5 |
| Nylon flock fiber length: about 0.5 mm | 20 | 0 |
| Total | 213 | 203 |

EPDM polymer: "NORDEL IP3640" manufactured by DuPont Dow Elastomer Japan, Inc.
Paraffin-based oil: "DIANA PROCESS OIL" manufactured by Idemitsu Kosan Co., Ltd.
Anti-aging agent: "NONFLEX OD-3" manufactured by Seiko Chemical Co., Ltd.
Organic peroxide: "PERKABOX 14RP" manufactured by Kayaku Akzo Co., Ltd.
Hardness of rubber composition for compression layer: 87 degrees (Adhesive Component in Adhesion Region)

As the thermoplastic resin for the adhesive component in the adhesion region, "E780MSTJ" manufactured by Nippon Miractran Co., Ltd., an ester-based thermoplastic polyurethane having a hardness of 80 degrees and a flow start temperature of 120° C. was used.

(Cord)

An aramid cord having a configuration of 1100 dtex/1×4 was used as the cord, and subjected to a RFL treatment and an overcoat treatment with a mucilage.

(Knitted Fabric)

As the knitted fabric, a knitted fabric (fiber member) having a weft knitting structure (moss stitch, 2 layers), obtained by knitting a cotton spun yarn (No. 40 count, 1 yarn) as a water-absorbent fiber and a PTT/PET conjugate composite yarn as a second fiber (fineness: 84 dtex), was used. Then, the above knitted fabric was immersed for 10 seconds in an immersion solution obtained by diluting a heat-reactive isocyanate ("ELASTRON BN-27" manufactured by DKS Co. Ltd., dissociation temperature: 180° C., solid content concentration: 30 mass %) with water such that the solid content concentration was 5 mass %, and then dried at 100° C. for 5 minutes to prepare a knitted fabric (fiber member) impregnated with a heat-reactive isocyanate.

(Configurations of V-Ribbed Belts of Examples 1 to 8 and Comparative Examples 1 and 2)

The configurations of the V-ribbed belts having the overlapping portion adhered in the shape of the adhesion region according to Examples 1 to 8 and Comparative Examples 1 and 2 will be described below with reference to FIG. 12 and FIG. 13.

Example 1

The overlapping length L was set to 8 mm, and the overlapping portion was reinforced with an adhesion region. As a rubber composition used in the adhesion region, a rubber composition was punched into a circle having a diameter of 2 mm from a tape-shaped rubber composition obtained by thinly forming the rubber composition for the adhesive component shown in Table I to a thickness of 80 µm, and this circular rubber composition was uniformly dispersed and arranged in the overlapping portion. The proportions of the area occupied by the adhesion region (total area of places where the circular rubber composition is provided) and the area occupied by the non-adhesion region, which was the region excluding the adhesion region from the overlapping portion, were 25% and 75%, respectively. Thereafter, the overlapping portion was crimped with a roller to form a knitted fabric having a joint portion adhered at the overlapping portion. Then, the V-ribbed belt of Example 1 of 3PK1200 (rib shape: K shape, number of ribs: 3, circumferential length: 1,200 mm) was obtained by the production method shown in the above embodiment (corresponding to the shape of the adhesion region shown in (b) in FIG. 6).

Example 2

The V-ribbed belt according to Example 2 was prepared in the same manner as in the Example 1 except that the overlapping length L was set to 4 mm and the proportions of the area occupied by the adhesion region and the area occupied by the non-adhesion region were 15% and 85%, respectively (corresponding to the shape of the adhesion region shown in (a) in FIG. 6).

Example 3

The V-ribbed belt according to Example 3 was prepared in the same manner as in the Example 1 except that the overlapping length L was set to 8 mm and the rubber composition serving as an adhesion region was provided in the entire overlapping portion by arranging a tape-shaped rubber composition having a width of 8 mm in the overlapping portion (corresponding to the shape of the adhesion region shown in (a) in FIG. 8).

Example 4

The V-ribbed belt according to Example 4 having the adhesion region of 25% (non-adhesion region: 75%) reinforced with a thermoplastic polyurethane was prepared in the same manner as in the Example 1 except that, as the adhesive component in the adhesion region, thermoplastic polyurethane (TPU) was used instead of the rubber composition used in Example 1 and was melted with a dispenser and attached to the knitted fabric in the form of circular dots having a diameter of 2 mm (corresponding to the shape of the adhesion region shown in (b) in FIG. 6).

Example 5

The V-ribbed belt according to Example 5 was prepared in the same manner as in the Example 2 except that the overlapping length L was set to 4 mm and the adhesive component used in the adhesion region was a thermoplastic polyurethane (corresponding to the shape of the adhesion region shown in (a) in FIG. 6).

Example 6

In the V-ribbed belt according to Example 6, the overlapping length L was set to 8 mm, a thermoplastic polyurethane was used as the adhesive component in the adhesion region, and this thermoplastic polyurethane was adhered in a wavy shape (line width of about 2 mm). The area of the adhesion region in this case was about 40% (the area of the non-adhesion region was about 60%) (corresponding to the shape of the adhesion region shown in (b) in FIG. 7).

Example 7

The V-ribbed belt according to Example 7 having the adhesion region of 25% (non-adhesion region: 75%) reinforced with a rubber composition in which a CNF was dispersed was prepared in the same manner as in the Example 1 except that, as the adhesive component in the adhesion region, a rubber composition in which a 0.1 mass % CNF ("SUNROSE SLD-F1" manufactured by Nippon Paper Industries Co., Ltd., a carboxymethylated CNF (powder), purity: 99% or more) was dispersed in the rubber composition for the adhesive component used in Example 1 by a homogenizer method was used (corresponding to the shape of the adhesion region shown in (b) in FIG. 6).

Example 8

The V-ribbed belt according to Example 8 having the adhesion region of 25% (non-adhesion region: 75%) reinforced with a thermoplastic polyurethane in which a CNF was dispersed was prepared in the same manner as in the Example 4 except that, as the adhesive component in the adhesion region, a thermoplastic polyurethane in which a 0.1 mass % CNF ("SUNROSE SLD-F1" manufactured by Nippon Paper Industries Co., Ltd., a carboxymethylated CNF (powder), purity: 99% or more) was dispersed in the thermoplastic polyurethane used in Example 4 by a homogenizer method was used (corresponding to the shape of the adhesion region shown in (b) in FIG. 6).

Comparative Example 1

The V-ribbed belt according to Comparative Example 1 is a belt in which one end and the other end of the knitted fabric were adhered to each other by ultrasonic welding such that the ends of the knitted fabric were in the state of butt joint without overlapping each other. Thus the V-ribbed belt according to Comparative Example 1 has a configuration in which there is no overlapping portion and no adhesion region (see FIG. 13).

Comparative Example 2

The V-ribbed belt according to Comparative Example 2 has a configuration in which an overlapping portion with an overlapping length L of 8 mm is provided, but there is no adhesion region (non-adhesion region is 100%: see FIG. 13).

(Durability Test Method)

Figure 11:
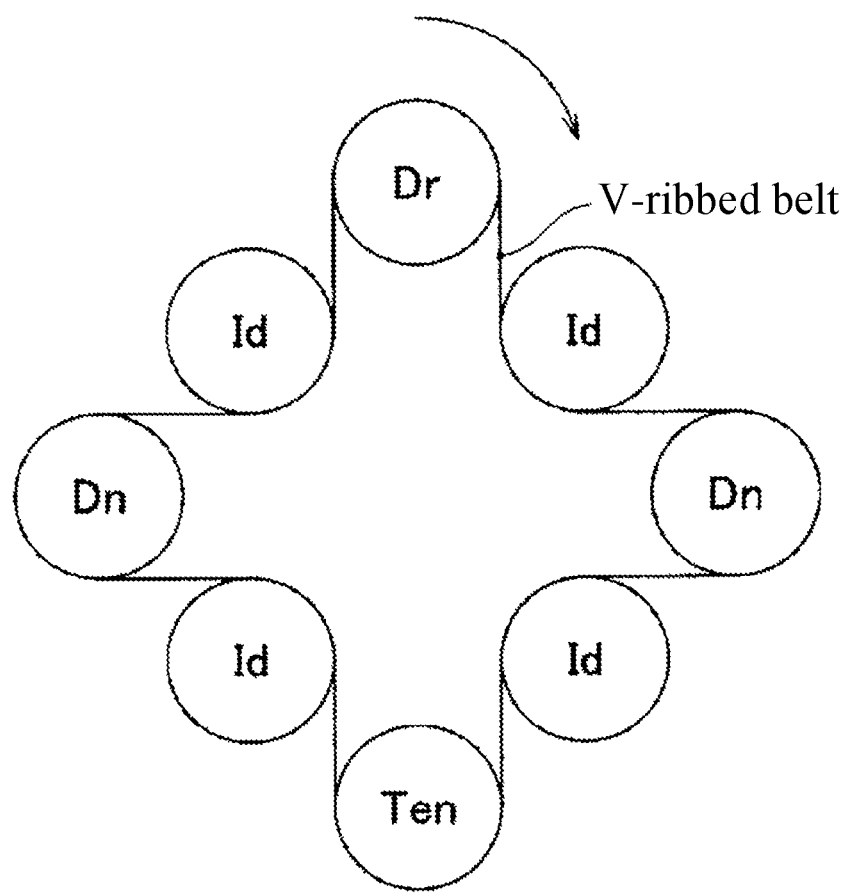
FIG. 11 FIG. 11 is a layout of a multi-axis running tester used in a durability test for Examples.

The durability test was performed by using a multi-axis running tester in which a drive pulley (Dr.), an idler pulley (Id), a driven pulley (Dn), and a tension pulley (Ten) each having a diameter of 50 mm were arranged in the layout shown in FIG. 11. Specifically, each V-ribbed belt of 3PK1200 (rib shape: K shape, number of ribs: 3, circumferential length: 1,200 mm) was installed over each pulley of the multi-axis running tester, and each V-ribbed belt was run under conditions that the rotation speed of the drive pulley was 5,600 rpm, the driven pulley and the idler pulley were unloaded, and the belt tension was 294 N/3 ribs. The test temperature (atmospheric temperature) was 100° C., and it was confirmed whether the knitted fabric was peeled off or the rib rubber was cracked for up to 200 hours. The results of the durability test are shown in FIG. 12 and FIG. 13.

(Discussion of Results of Durability Test)

In Comparative Example 1 in which one end and the other end of the knitted fabric are adhered to each other by conventional ultrasonic welding, crack occurred in the rib rubber at the joint portion and the life was 72 hours, probably because the elasticity of the knitted fabric at the joint portion was reduced and stress was concentrated thereon. Further, in Comparative Example 2 in which the adhesion region is not present in the overlapping portion, a problem that the knitted fabric was peeled off from the rib surface occurred in a short time of 15 hours.

On the other hand, Examples 1 to 8 having an overlapping portion and an adhesion region at the joint portion of the knitted fabric had a life of 100 hours or longer in the durability test, and showed an effect of preventing the occurrence of peeling and cracks. Example 3 is an example in which a rubber composition serving as an adhesion region is provided over the entire overlapping portion for reinforcement, but the time until cracks occur was shorter than in Example 1 and Example 2. It is considered that this is because the elasticity of the knitted fabric was hindered by the reinforcement by the adhesive component in the adhesion region, and thus the stress was concentrated on the joint portion of the overlapping portion when the V-ribbed belt was bent. It is considered that the life can be further extended by adopting a form in which the belt has both an adhesion region and a non-adhesion region in the overlapping portion as in Example 1 and Example 2.

Examples 4 to 6 which are examples using a thermoplastic elastomer as the adhesive component in the adhesion region had no peeling or cracks occurred at the durability test of 200 hours, and showed results better than those in the case of using the rubber composition as the adhesive component in the adhesion region. The reason why good results were obtained with a thermoplastic elastomer is not clear, but it is considered that the adhering strength and stress distribution were well-balanced.

Example 7 is an example using a rubber composition in which a CNF is dispersed as the adhesive component in the adhesion region. The durability test life thereof was improved as compared with Example 1. In addition, Example 8 is an example using a thermoplastic polyurethane in which a CNF is dispersed as the adhesive component in the adhesion region. The durability test life thereof was improved as compared with Example 4. It is considered that this is because when the CNF is added to the adhesive component in the adhesion region, the CNF enters between the fibers of the knitted fabric while being integrated with the adhesive component and the CNF and the fibers of the knitted fabric are entangled, thereby improving the adhesive force between the knitted fabric and the adhesive component.

Although the preferred embodiment of the present invention has been described above, the present invention is not limited to the above-described embodiment, and various design changes can be made as long as it is described in the claims. The present application is based on Japanese Patent Application No. 2018-229330 filed on Dec. 6, 2018, and Japanese Patent Application No. 2019-204481 filed on Nov. 12, 2019, the contents of which are incorporated herein by reference.

REFERENCE SIGNS LIST

1 V-ribbed belt
2 rib portion
3 tension layer
4 compression layer
5 cord
6 knitted fabric
62 overlapping portion
63 adhesion region
64 non-adhesion region
10 formed body
21 drive pulley
22 driven pulley
23 V-shaped groove
51 flexible jacket
52 inner mold
53 outer mold
53a rib mold
L overlapping length

The invention claimed is:

1. A frictional power-transmission belt comprising a compression layer and a knitted fabric,
   wherein a surface of the compression layer is covered with the knitted fabric,
   the knitted fabric has an overlapping portion in which one end and another end of the knitted fabric overlap each other, and
   the overlapping portion has an adhesion region containing an adhesive component that adheres the one end and the other end of the knitted fabric to each other, and a non-adhesion region in which the one end and the other end of the knitted fabric are not adhered to each other.

2. The frictional power-transmission belt according to claim 1, wherein the adhesion region includes a plurality of adhesion regions,
   wherein each of the adhesion regions is arranged discontinuously in a belt width direction.

3. The frictional power-transmission belt according to claim 1, wherein the adhesion region includes a plurality of adhesion regions and the non-adhesion region includes a plurality of non-adhesion regions,
   wherein the plurality of the adhesion regions and the plurality of non-adhesion regions are arranged in a checkered pattern.

4. The frictional power-transmission belt according to claim 1, wherein the adhesion region is in a wavy shape or a zigzag shape.

5. The frictional power-transmission belt according to claim 1, wherein a total area of the adhesion region accounts for 10% to 50% of an area of the overlapping portion.

6. The frictional power-transmission belt according to claim 1, wherein the knitted fabric is impregnated with an isocyanate.

7. The frictional power-transmission belt according to claim 1, wherein, in the adhesion region, the one end and the other end of the knitted fabric are adhered by the adhesive component other than an isocyanate.

8. The frictional power-transmission belt according to claim 7, wherein the adhesive component comprises a thermoplastic elastomer.

9. The frictional power-transmission belt according to claim 8, wherein the thermoplastic elastomer is a thermoplastic polyurethane.

10. The frictional power-transmission belt according to claim 1, wherein the adhesive component comprises a cellulose nanofiber.

11. The frictional power-transmission belt according to claim 1, wherein the overlapping portion has a length of 2 mm or more and 10 mm or less in a belt circumferential direction.

12. A method of producing a frictional power-transmission belt in which a surface of a compression layer is covered with a knitted fabric having an overlapping portion in which one end and another end of the knitted fabric overlap each other,
- wherein the method comprises a step of arranging a rubber composition sheet having a thickness of 50 μm to 150 μm between an upper side of the one end of the knitted fabric and a lower side of the other end of the knitted fabric, the rubber composition sheet including one of a diene-based rubber, an ethylene-α-olefin elastomer, a chlorosulfonated polyethylene rubber, an alkylated chlorosulfonated polyethylene rubber, an epichlorohydrin rubber, an acrylic rubber, a silicone rubber, a urethane rubber, and a fluororubber.

13. A method of producing a frictional power-transmission belt in which a surface of a compression layer is covered with a knitted fabric having an overlapping portion in which one end and another end of the knitted fabric overlap each other, the overlapping portion having an adhesion region including an adhesive component that adheres the one end and the other end of the knitted fabric to each other, and a non-adhesion region in which the one end and the other end of the knitted fabric are not adhered to each other,
- wherein the method comprises a step of arranging a melted thermoplastic elastomer in the adhesion region between an upper side of the one end of the knitted fabric and a lower side of the other end of the knitted fabric, the melted thermoplastic elastomer including one of polyethylene, polypropylene, polystyrene, polyvinyl chloride, and polyurethane.

* * * * *